US006966867B2

(12) United States Patent
Tajima et al.

(10) Patent No.: US 6,966,867 B2
(45) Date of Patent: Nov. 22, 2005

(54) CONTROL DEVICE FOR HYBRID VEHICLES

(75) Inventors: Yoichi Tajima, Anjo (JP); Yoshitaka Murase, Anjo (JP); Takayuki Kubo, Anjo (JP); Yasuhiko Kobayashi, Anjo (JP); Shigeki Takami, Anjo (JP); Yukinori Nakamori, Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 49 days.

(21) Appl. No.: 10/724,128

(22) Filed: Dec. 1, 2003

(65) Prior Publication Data

US 2004/0127326 A1  Jul. 1, 2004

(30) Foreign Application Priority Data

Dec. 27, 2002  (JP) .............................. 2002-382544

(51) Int. Cl.[7] .......................... B60L 11/00; B60L 9/00; H02P 1/00; H02P 3/00; H02P 7/00
(52) U.S. Cl. ................. 477/7; 477/3; 701/22; 290/40 R
(58) Field of Search ....................... 477/2, 3, 7; 701/22; 180/65.2; 290/40 R, 51

(56) References Cited

U.S. PATENT DOCUMENTS

| 5,939,848 | A | * | 8/1999 | Yano et al. .................. 318/139 |
| 5,944,630 | A | * | 8/1999 | Omote .......................... 477/5 |
| 6,054,844 | A | * | 4/2000 | Frank .......................... 322/16 |
| 6,067,801 | A | * | 5/2000 | Harada et al. ................ 60/705 |
| 6,190,282 | B1 | * | 2/2001 | Deguchi et al. ................ 477/5 |
| 6,362,536 | B1 | * | 3/2002 | Izumiura et al. .......... 290/40 C |
| 6,565,480 | B2 | * | 5/2003 | Endo et al. ................... 477/37 |
| 6,756,758 | B2 | * | 6/2004 | Karikomi et al. ........... 318/434 |
| 2005/0054480 | A1 | * | 3/2005 | Ortmann et al. ............... 477/6 |

FOREIGN PATENT DOCUMENTS

| JP | A 05-168105 | 7/1993 |
| JP | A 09-215270 | 8/1997 |

* cited by examiner

*Primary Examiner*—Tisha Lewis
(74) *Attorney, Agent, or Firm*—Oliff & Berridge, PLC

(57) ABSTRACT

A control device for hybrid vehicles, including a motor drivingly connected to an engine, a transmission that transmits output torques of the engine and the motor to drive wheels, and a controller that performs torque reduction control by which an input torque to the transmission is reduced, wherein when torque reduction control is consecutively performed, the input torque is reduced at least once by a negative torque output from the motor.

18 Claims, 15 Drawing Sheets

CONTROL DEVICE FOR HYBRID VEHICLES

INCORPORATION BY REFERENCE

The disclosure of Japanese Patent Application No.2002-382544 filed on Dec. 27, 2002 including the specification, drawings and abstract are incorporated herein by reference in its entirety.

BACKGROUND OF THE INVENTION

1. Field of Invention

The invention relates to a control device for hybrid vehicles.

2. Description of Related Art

There exists a parallel hybrid system, in which both an engine and a motor/generator are attached to a transmission at the time of starting and acceleration. Drive forces from both the engine and the motor/generator are transmitted to the transmission. When a vehicle is running on a downward slope or subjected to braking, the motor/generator functions as a generator to compensate for an engine brake effect and to regenerate a braking energy to improve fuel consumption and reduce an emission of exhaust gases (see, for example, JP-A-9-215270).

Also, there exists a series hybrid system, in which an engine, a motor, and a generator are attached to a transmission. The engine drives the generator to generate electricity, by which the motor is driven for running, and the engine with a small output is operated quasi-steadily in an efficient region to cause a running of a vehicle while efficiently charging a battery with electricity (see, for example, JP-A-5-168105).

Being not limited to hybrid vehicles (Hybrid Electric Vehicle), in vehicles that run on a drive torque provided only by an engine, when a vehicle performs an inertial running (coast running) without relying on engine torque, a driver again steps on an accelerator pedal and an automatic transmission is provided between the engine and drive wheels, switchover to a driving state is made. Switchover to a driving state is made in which a quantity of engine torque produced by a corresponding start of the engine exceeds a quantity of torque transmitted through the transmission from a side of the drive wheels. Thereby, mutually meshing gears momentarily strike against one another to generate so-called crank noises.

In order to avoid such a disadvantage engine torque can be reduced by making use of an electronic controlled throttle, or a control for regulation of engine ignition timing with lag setting.

SUMMARY OF THE INVENTION

However, when a lag is set to reduce an output engine torque when an accelerator is turned ON for acceleration from a coast running, limitations on time are involved in terms of emission deterioration, which is caused by a lag in ignition timing. Therefore, when a demand for reduction is consecutively made in order to reduce a shock attributed to clutch engagement at the time of a subsequent speed change effected by an automatic transmission, it cannot be met. Also, control, which accompanies a turning ON of an accelerator to regulate a target throttle opening degree and an actual throttle opening degree with an electronic controlled throttle, is too low in response to a stepping-on of an accelerator pedal to be used for reduction control at the time of a speed change.

This invention thus provides a control device for hybrid vehicles, which makes use of a peculiar motor and can meet a demand for a reduction of an input torque to an automatic transmission (speed change gears) that is consecutively made, thus solving the above-mentioned problem.

The invention, according to a first exemplary aspect provides a control device for hybrid vehicles, comprising a motor drivingly connected to an engine, a transmission that transmits output torques of the engine and the motor to drive wheels, and a controller that performs torque reduction control by which an input torque to the transmission is reduced, wherein when torque reduction control is consecutively performed, the input torque is reduced at least once by a negative torque output from the motor.

"Motor" in the invention is not limited to so-called motors in a narrow sense to convert electric energy into rotational movements but presents a concept containing so-called generators to convert rotational movements into electric energy.

For the purposes of this disclosure, device and means maybe considered synonyms. Further, in some cases, as defined in the specification, the device/means may include other elements.

BRIEF DESCRIPTION OF THE DRAWINGS

Various embodiments of the invention will be described with reference to the drawings, wherein.

DETAILED DESCRIPTION OF PREFERRED EMBODIMENTS

Figure 1:
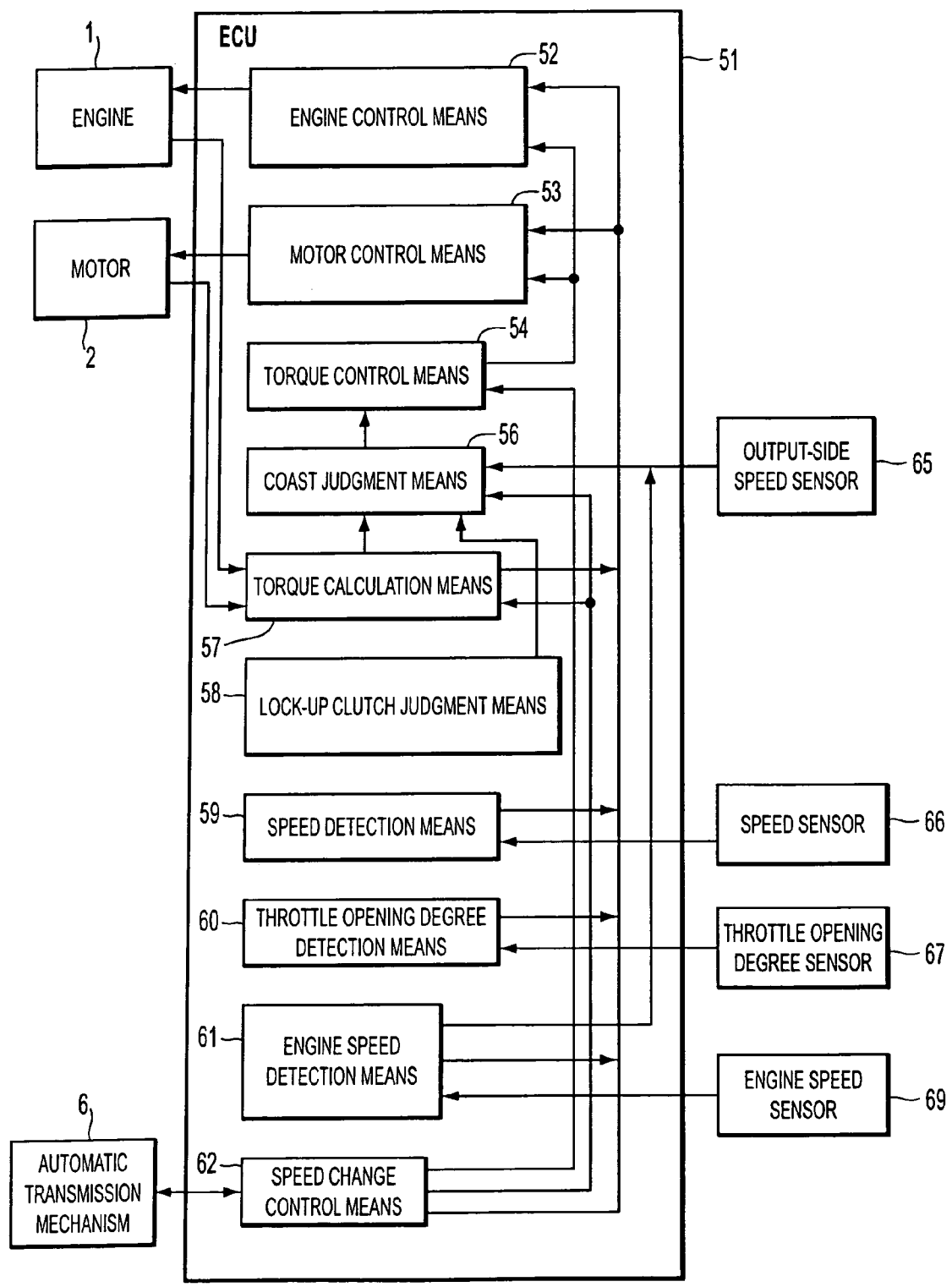
FIG. 1 is a block diagram illustrating a control device of a vehicle according to a first embodiment.

A first embodiment of the invention will be described below with reference to the drawings. FIG. 1 is a block diagram illustrating a control device for hybrid vehicles, according to the embodiment, FIG. 2 is a block diagram illustrating a drive system of a hybrid vehicle, which can be controlled by the control device according to the embodiment, FIG. 3 is a cross sectional view showing in detail an example of the drive system of the hybrid vehicle, FIG. 4 is a cross sectional view showing in detail an essential part of the drive system shown in FIG. 3, and FIGS. 5 to 7 are flowcharts illustrating control by the control device.

Figure 2:
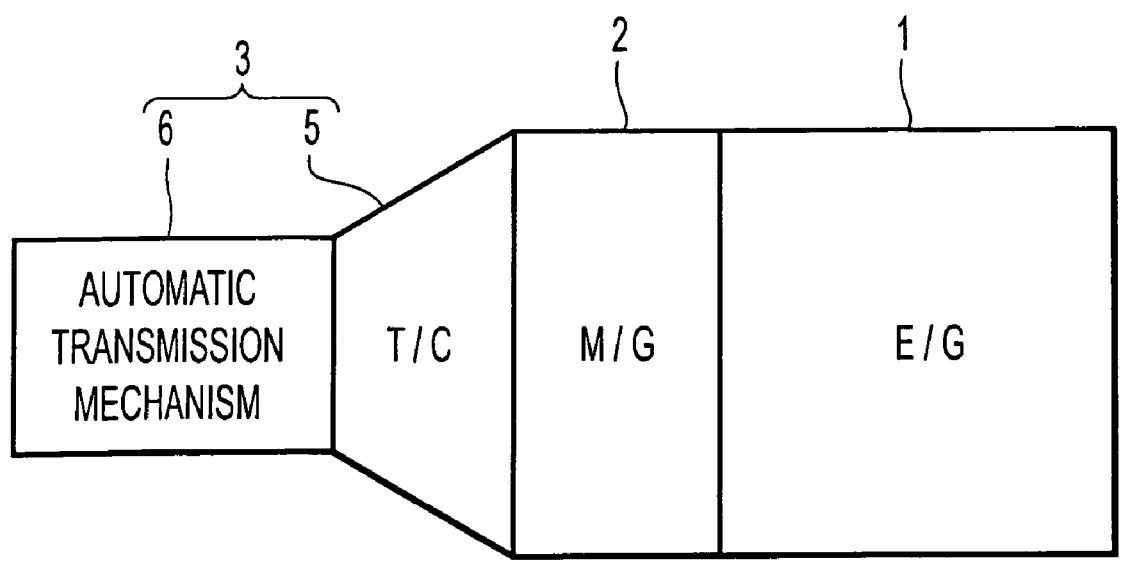
FIG. 2 is a block diagram illustrating a drive system of a hybrid vehicle that can be controlled by the control device.

As shown in FIG. 2, a drive source of the hybrid vehicle comprises an internal combustion engine (referred below simply to as engine) 1, and a motor/generator (referred below simply to as motor) 2 composed of a brushless DC motor or the like, that outputs its drive force to an automatic transmission 3. The automatic transmission 3 transmits output torque of the engine 1 and the motor 2 to drive wheels (not shown) on a downstream side of power transmission and comprises a torque converter 5 and an automatic transmission mechanism (multiple transmission mechanism) 6. In addition, "internal combustion engine" in the embodiment burns fuel to convert energy into rotational movements, and presents a concept containing gasoline engines, diesel engines, and so on.

The automatic transmission mechanism 6 includes a plurality of frictional engagement elements (not shown) for variable speed, and variable speed change control means 62 (described later) that controls and modifies states of engagement of the frictional engagement elements. Thereby, drive forces input from the engine 1 and the motor 2 are varied in speed on the basis of traveling conditions of a concerned vehicle to be output to drive wheels and so on.

Figure 3:
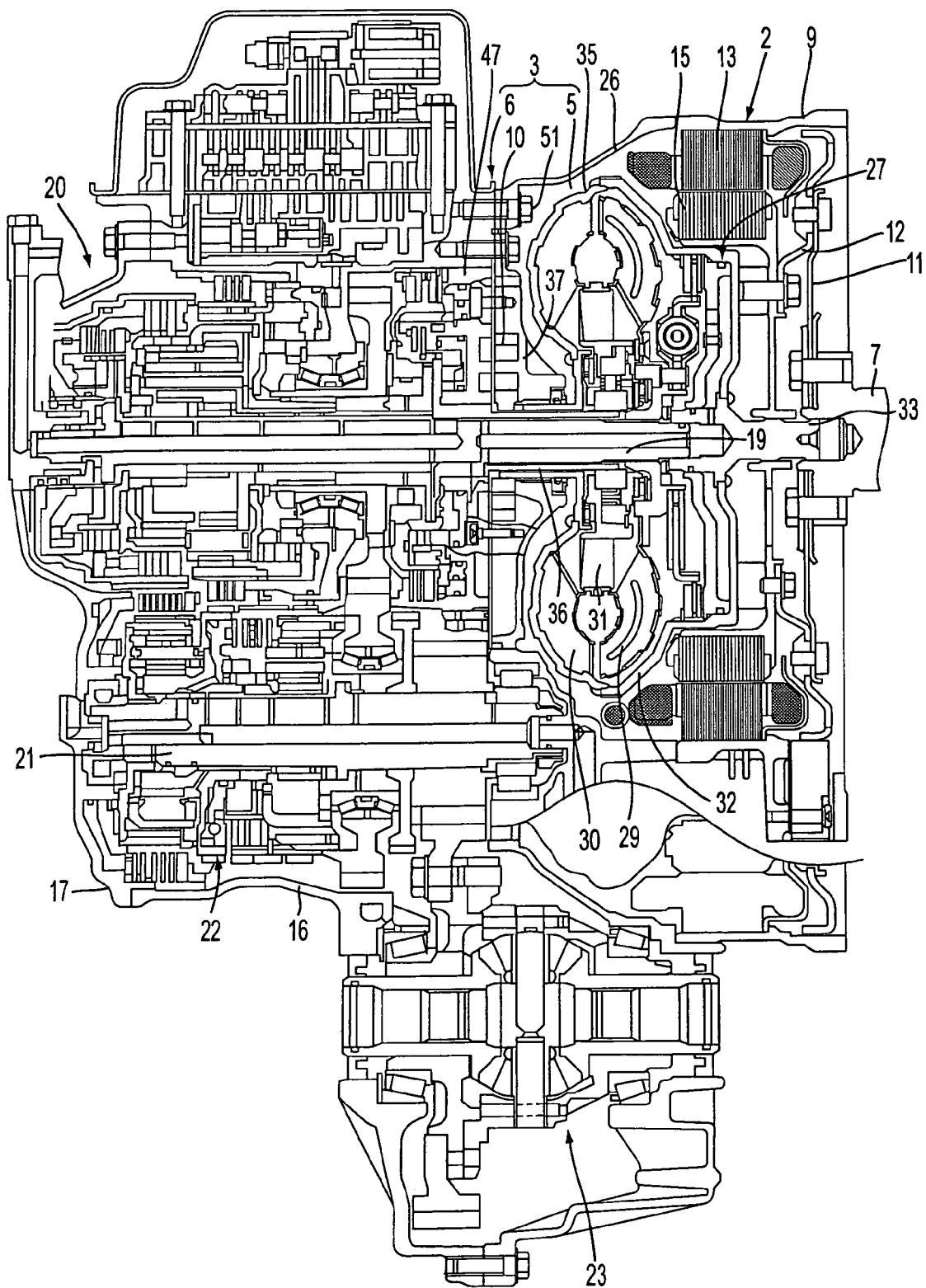
FIG. 3 is a cross sectional view showing in detail an example of a drive system of a vehicle.
Figure 4:
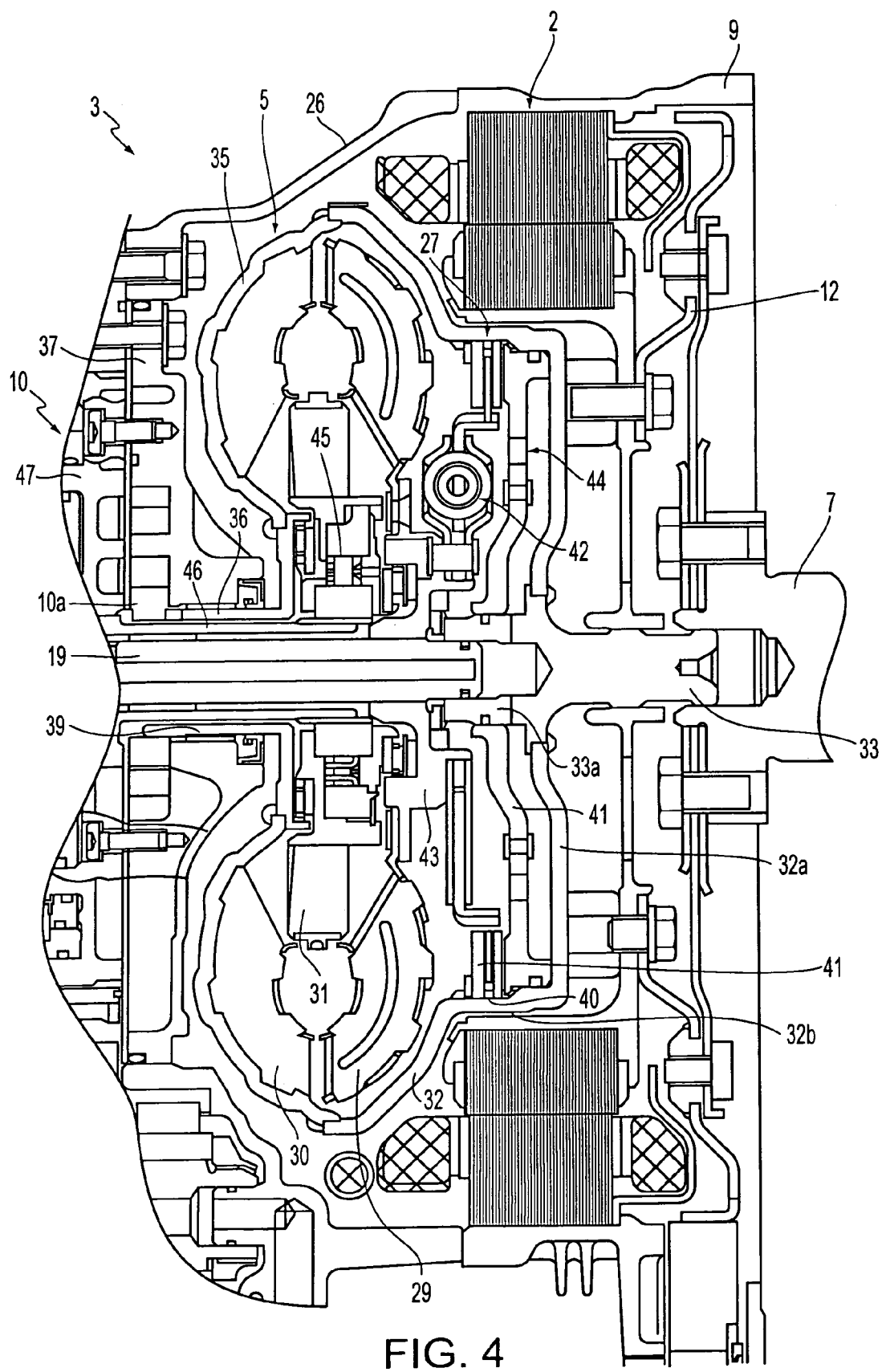
FIG. 4 is a cross sectional view showing in detail an essential part of the drive system shown in FIG. 3.
Figure 5:
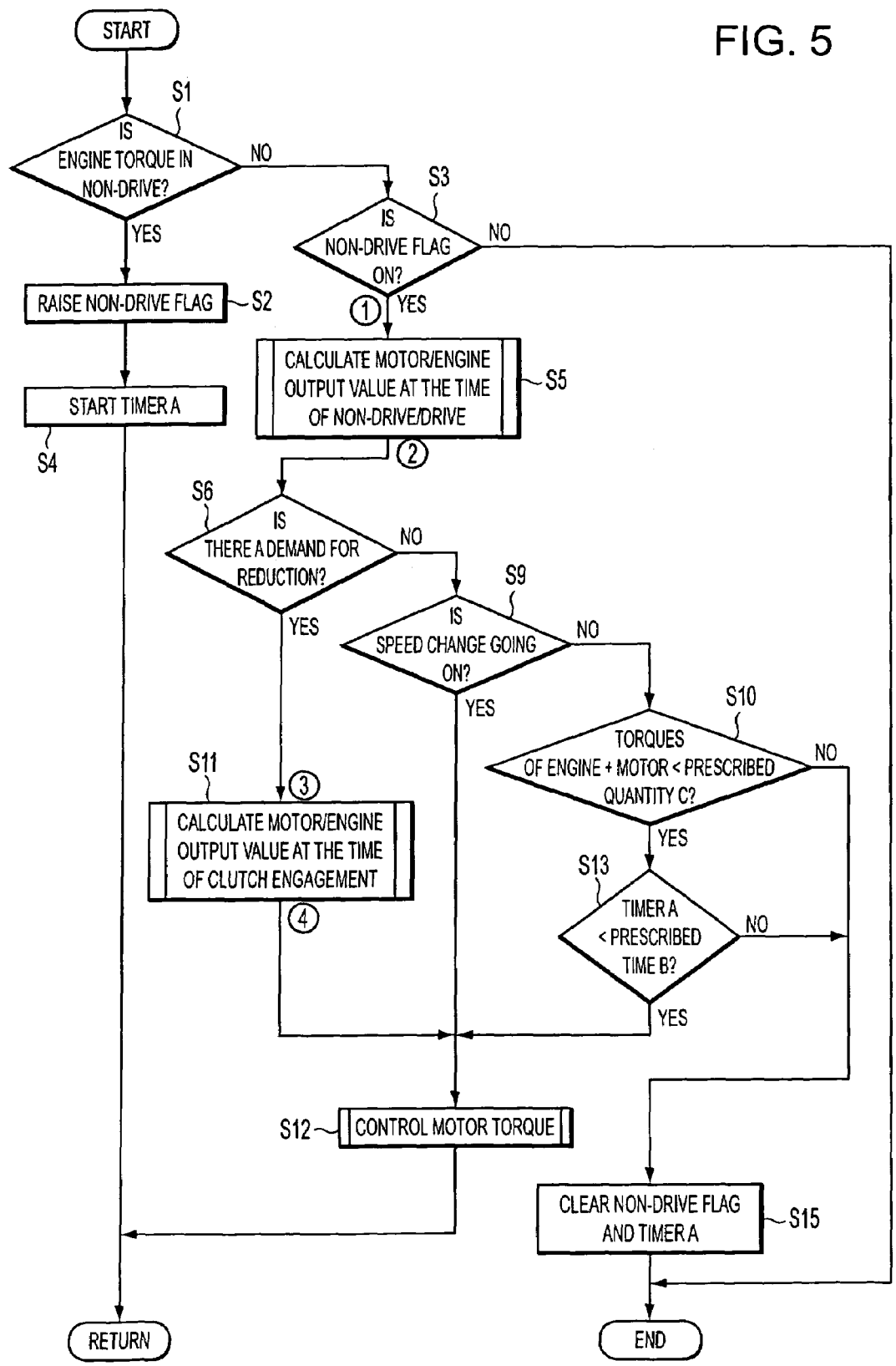
FIG. 5 is a flowchart illustrating control in a first embodiment.

As shown in FIG. 3, the motor/generator 2 is attached to the torque converter of the automatic transmission (A/T), and the drive system of the vehicle comprises the internal combustion engine (only an engine output shaft 7 being shown in the figure) 1, the motor/generator 2 received in a motor housing 9, and the automatic transmission 3, to which drive forces of the engine 1 and the motor 2 are transmitted. That is, with the drive system of the vehicle, the motor/generator 2 and a torque converter 5 and the automatic transmission mechanism 6 of the automatic transmission 3 are provided in this order from an engine side (right side in FIG. 3). An oil pump 10 is arranged between the torque converter 5 and the automatic transmission mechanism 6.

A crankshaft (engine output shaft) 7 is extended to the automatic transmission 3 from the engine 1 (see FIG. 2), and a flexible drive plate 11 is fixed to a tip end of the crankshaft 7. Also, a flexible input plate 12 is arranged in a position opposed to the drive plate 11 such that tip ends of both plates are fixed and connected to each other by means of bolts. The motor/generator 2 comprises a stator 13 and a rotor 15.

The automatic transmission mechanism 6 provided on the automatic transmission 3 is received in a transmission casing 16 and a rear casing 17. The automatic transmission mechanism 6 comprises a main transmission mechanism part 20 arranged coaxial with an input shaft 19, a sub-transmission mechanism part 22 arranged coaxial with a counter shaft 21 parallel to the input shaft 19, and a differential device 23 arranged coaxial with a front-wheel drive shaft. These parts being of a FF (front-engine/front-drive) received in an integral, separable casing.

The torque converter 5 is received in a converter housing 26, and comprises a lock-up clutch 27, a turbine runner 29, a pump impeller 30, a stator 31, and a front cover 32 arranged to cover these parts, and a center piece 33 fixed on an outside of a center of rotation thereof. A rear cover 35 is welded to the front cover 32 to be provided integrally on an outer shell of the pump impeller 30, and a sleeve-shaped impeller hub 36 is fixed integrally to an inside-diameter portion (central portion of rotation) of the rear cover 35 by welding.

As shown in FIG. 4, the impeller hub 36 is rotatably supported through a bush 39 on an inner peripheral surface of a cylindrical portion of a pump casing 37, which is integral with the casings 16, 17 and is coupled at its tip end to a rotor 10a of the oil pump 10.

Also, the lock-up clutch 27 is received and arranged on an inside-diameter side of an intermediate portion 32b of the front cover 32, and a spline 40 extending in an axial direction is formed integrally on an inner peripheral surface of the intermediate portion 32b. A plurality of outer friction plates engage with the spline 40 in a coming-off preventive manner. Further, a piston plate 41 is oil tight and movably arranged between the inner peripheral surface of the intermediate portion 32b and an outer peripheral surface of a piston hub 33a integral with a center piece 33.

Also, the input shaft 19 is arranged coaxial with the center piece 33, and the input shaft 19 extends through the bush 39 at the center of rotation of the torque converter 5 in a state, in which one end thereof is rotatably fitted into an inner periphery of the piston hub 33a and the other end thereof is extended toward the multiple transmission mechanism 6. The lock-up clutch 27 is connected at an inside-diameter side thereof to the input shaft 19 through a damper device 42, which absorbs shock rotation, and a hub 43, which is connected to the turbine runner 29, in a state, in which an outside-diameter side thereof engages with an inner peripheral surface of the motor 2. The hub 43 spline-engages with the input shaft 19. Also, the stator 31 is fixed to a pump cover 47 through a one-way clutch 45 and a sleeve shaft 46.

In addition, the front cover 32 constitutes an input member of the torque converter 5, and the input shaft 19 of the automatic transmission mechanism 6 connected to the turbine runner 29 through the hub 43 constitutes an output member of the torque converter 5.

With the lock-up clutch 27 constructed in the above manner, a predetermined oil pressure is fed to or released from an oil chamber of a lock-up control valve 44, which comprises the oil chamber defined by the piston plate 41 and a front-cover inside-diameter portion 32a, to thereby move the piston plate 41. Thus, controlling a bias against the outer friction plates of the piston plate 41 to enable effecting coupling (engagement), release, or slip control on the friction plates. In addition, the slip control is one that gradually conforms an input side and an output side to each other in rotational speed and engages them with each other while sliding the friction plates of the clutch 27 relative to one another in a state, in which an appropriate difference comes out between the input side and the output side.

The control device of the hybrid vehicle according to the invention will be described below with reference to FIG. 1. As shown in the figure, the control device comprises an ECU (Electric Control Unit) 51. The ECU 51 comprises engine control means 52, motor control means 53, torque control means 54, coast judgment means 56, torque calculation means 57, lock-up clutch judgment means 58, speed detection means 59, throttle opening degree detection means 60, engine speed detection means 61, and speed change control means 62.

Connected to the ECU 51 are an output-side speed sensor 65 for detecting the rotational speed of the input shaft 19 (output member) of the automatic transmission mechanism 6, a speed sensor 66 for detecting the running speed of a vehicle, a throttle opening degree sensor 67 for detecting a throttle opening degree according to a quantity, by which an accelerator pedal (not shown) is stepped, and an engine speed sensor 69 for detecting the rotational speed of the engine 1 (therefore, the rotational speed of the torque converter 5 on an input side). Further, connected to the ECU 51 are the engine 1, the motor/generator 2, and the automatic transmission mechanism 6.

In addition, provided on the engine 1 is a computer (not shown) for outputting an output torque and an inertia torque as predetermined torque signals on the basis of the rotational speed of the crankshaft, and provided on the motor 2 is a computer (not shown) for outputting an output torque and an inertia torque as predetermined torque signals on the basis of a current value passed to the motor.

The engine control means 52 executes various controls with respect to engine driving, such as shutdown control of the engine 1. The shutdown control of the engine 1 is based on the vehicular speed detected by the speed detection means 59 and detection results of the speed sensor 66 and a brake acting condition based on detection results of a brake sensor (not shown), judgment of complete explosion of the engine 1, ignition control of the engine 1, or the like. In the ignition control, the engine control means 52 also executes control to turn the injection OFF and to stop the driving of the engine 1 when the speed detection means 59 detects the occurrence of the speed 0 [km/h] on the basis of detection results of the speed sensor 66 and to turn the injection ON for ignition and to rotatingly drive the engine 1 when the throttle opening assumes a predetermined value or higher and the engine speed assumes a predetermined value or higher after running is started by rotational driving with only the motor 2. Further, the engine control means 52 executes coast control to turn the injection OFF and to stop the driving of the engine 1 during the running of the vehicle according to a predetermined condition. The predetermined condition including a driver that loosens a stepping on the accelerator pedal to make the throttle opening 0%, or the like, thus causing the vehicle to perform inertial running (coast running). Also, the engine control means 52 executes control to decrease torque of the engine 1 by setting a lag on the engine 1 in response to a command from the torque control means 54 described later.

The motor control means 53 executes running drive control including starting control, shutdown control, and assist control by the motor/generator 2. The running drive control also including generation control, in which the motor/generator 2 generates a negative torque to produce electricity, regenerative control, in which drive forces from the wheels are regenerated, or the like. The motor control means 53 also timely controls the motor/generator 2 on the basis of various conditions, such as a driver's intention for deceleration, detected on the basis of a vehicle speed detected by the speed detection means 59, a throttle opening degree detected by the throttle opening degree detection means 60, or detection results of the brake sensor, a command from speed change control means 62, and calculated data from the torque calculation means 57. Also, the motor control means 53 executes control to perform regenerative control of the motor 2 in response to a command from the torque control means 54 described later to cause the motor to output a negative torque to decrease a drive torque of the engine 1 by a predetermined quantity.

The torque control means 54 executes control in a manner to eliminate a shock caused when the engine is driven again, by forwarding a predetermined command to the motor control means 53 upon receipt of a signal to the effect that a coast condition is judged by the coast judgment means 56. The torque control means 54 also causes the motor 2 to output a negative torque, when driving of the engine 1 is started from the coast condition, so that an output torque at the start of driving of the engine 1 does not exceed an input torque transmitted through the automatic transmission 3 from a side of drive wheels. Also, the torque control means 54 functions as speed change detection means to output a command to the engine control means 52 and/or the motor control means 53 when it is detected that the automatic transmission mechanism 6 has output a signal (a demand for starting of speed change) to the effect that speed change is carried out subsequent to the starting of driving from the coast condition. In response to the command output, the engine control means 252 performs control by carrying out a torque-down due to a reduction in the number of cylinders and in fuel injection to decrease a shock caused at the time of speed change. Also, the motor control means 53 executes control to perform regenerative control of the motor 2 in response to the output to cause the motor to generate a negative torque, thereby decreasing a torque generated by driving of the engine 1 to decrease a shock caused at the time of speed change. In addition, the torque control means 54 together with the coast judgment means 56 constitutes torque-down control means to perform torque-down control at least once with a negative torque output from the motor 2 when torque-down control for reduction of an input torque to the automatic transmission 3 is consecutively carried out.

The coast judgment means 56 judges the presence and absence of the coast condition, in which the vehicle is caused to perform inertial running during the running of the vehicle, on the basis of detection results from the engine speed sensor 69 and the output-side speed sensor 65, and a torque signal from the torque calculation means 57. The coast judgment means 56 judges a state, in which the rotational speed (input rotational speed) from the side of drive wheels is larger than the engine speed, to be "non-drive" (that is, the coast condition), and a state, in which the input rotational speed is smaller than the engine speed, to be "drive" (that is, the engine drive running condition), when the lock-up clutch 27 is made OFF. Also, the coast judgment means 56 judges "non-drive" (that is, the coast condition) in drive→non-drive when an engine torque is 10 Nm or less, and "drive" (that is, the engine drive running condition) in non-drive→drive when an engine torque is 15 Nm or more and when the lock-up clutch 27 is made ON. When a judgment is made on the basis of the rotational speed, a predetermined change in rotational speed is detected with respect to the front cover 32 and the input shaft 19. The predetermined change in rotational speed is one when a difference in rotational speed between respective rotational speeds of the engine 1 (accordingly, the front cover 32) and the input shaft 19, which are input from the engine speed sensor 69 and the output-side speed sensor 65, is calculated.

The torque calculation means 57 receives a predetermined torque signal including an output torque from the engine 1 and an inertia torque to calculate an output torque of the engine 1 and an inertia torque. The torque calculations means 57 also receives a predetermined torque signal from the motor 2 to calculate an output torque of the motor 2 and an inertia torque, thus outputting an output torque of the engine 1 to the coast judgment means 56. While the speed change control means 62 described later performs speed change control, the torque calculation means 57 calculates an inertia torque of the engine crankshaft 7 (see FIG. 4) and the torque converter 5 on the basis of an engine speed detected by the engine speed detection means 61 in order to calculate a total sum of the calculated inertia torque. The torque calculation means 57 also calculates the output torque of the engine 1 and the motor 2 and the inertia torque, which have been beforehand calculated in order to output the same to the engine control means 52 and the motor control means 53.

The lock-up clutch judgment means 58 judges a state, in which the lock-up clutch 27 is actuated, that is, ON and OFF of engagement of the lock-up clutch.

The speed detection means 59 detects a running speed (vehicle speed) of a hybrid vehicle, on which the control device 1 is mounted, on the basis of detection results of the speed sensor 66 to output the same to the engine control means 52 and the motor control means 53.

The throttle opening degree detection means 60 detects a throttle opening degree according to a quantity, by which an accelerator pedal (not shown) is stepped, on the basis of detection results from the throttle opening degree sensor 67 to output the same to the engine control means 52 and the motor control means 53.

The engine speed detection means 61 detects an engine speed on the basis of detection results from the engine speed sensor 69 to output the same to the engine control means 52 and the motor control means 53.

The speed change control means 62 performs control through an engagement and release of a plurality of clutches, which comprise frictional engagement elements provided on the automatic transmission mechanism 6. The speed change control means 62 also performs control through a brake, on the basis of a vehicle speed detected by the speed detection means 59, a throttle opening degree detected by the throttle opening degree detection means 60, or the like, to execute various speed change control by means of the automatic transmission mechanism 6. Also, the speed change control means 62 detects a gear ratio (ratio of input and output rotational speeds) on the basis of rotational speeds of the input shaft 19 and the output shaft in the automatic transmission mechanism 6 and judges the start and termination of actual speed change on the basis of a change in the gear ratio.

Figure 14:
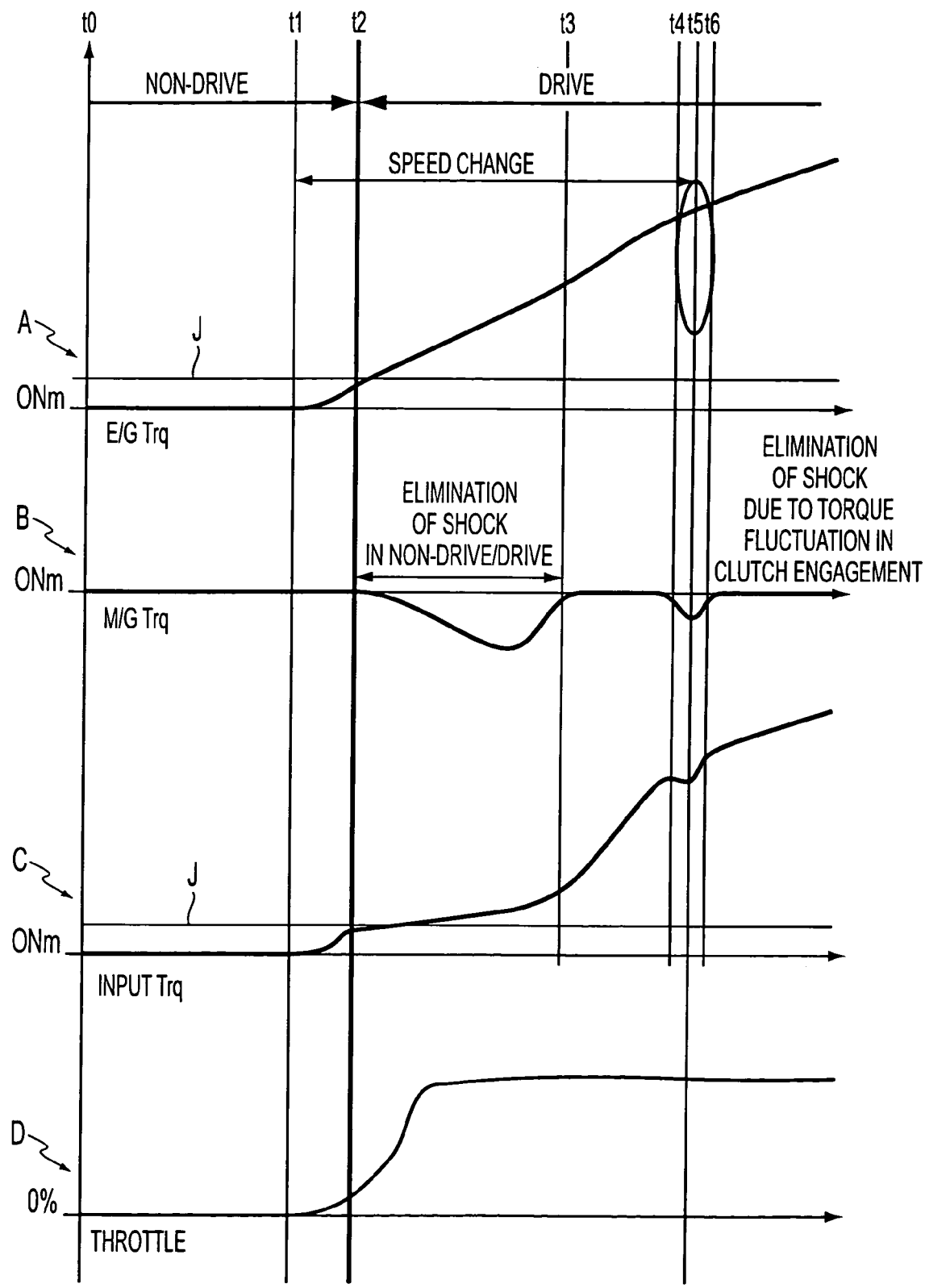
FIG. 14 is a timing chart illustrating examples of control common to the first and second embodiments according to the invention.

Subsequently, actions of the control device for hybrid vehicles, according to the embodiment, will be described with reference to FIGS. 1, 5 to 7, and 14. FIG. 14 is a timing chart illustrating examples of control in the embodiment and in a second embodiment described later. In FIG. 14, A indicates changes in engine torque (E/GTrq) [Nm], B indicates changes in motor torque (M/GTrq) [Nm], C indicates changes in input torque (InputTrq) [Nm] of the automatic transmission 3, and D indicates changes in throttle opening degree (Throttle) [%]. In addition, J indicates a torque value for a judgment of a drive/non-drive state (referred below to as drive/non-drive judgment torque value J).

In addition, it is assumed in the following descriptions that torque output at the time of driving of the engine 1 and the motor 2 is "positive torque" and torque at the time when driving of the engine 1 is suppressed as well as at the regeneration with the motor 2 and torque acted from the side of drive wheels are "negative torque". In the first embodiment, the motor 2 essentially carries out consecutive processings, that is, a process of decreasing a shock when returning from the coast condition, and a process of decreasing a shock when changing a speed in the automatic transmission mechanism 6, succeeding the former processing. Control is also performed to decrease torque of the engine 1 in unavoidable occasions.

First, when an ignition switch (not shown) is turned ON and a shift lever (not shown) provided around a driver's seat is manipulated to a running state, the motor control means 53 begins control and the motor 2 is driven according to a stepping-on of an accelerator pedal to begin running. After which the engine control means 52 starts the engine 1 at a predetermined timing and the motor control means 53 shuts down a torque output of the motor, in which state running is continued.

When the above control is started, it is determined in STEP S1 whether engine torque is in a non-drive state (that is, the coast condition, in which no torque is output from the engine 1). More specifically, in a state, in which the judgment of the lock-up clutch being OFF is received from the lock-up clutch judgment means 58, when the coast judgment means 56 determines that a rotational speed (referred below to as input rotational speed) acted from the side of drive wheels to the side of engine is larger than a rotational speed (referred below to as engine rotational speed) due to engine driving and engine torque is in a non-drive state (time t0 to t1 in FIG. 14). If it is determined that the engine-torque is in a non-drive state a non-drive flag is raised (STEP S2) to start a timer A (STEP S4) to start counting a control time.

Meanwhile, when it is determined in STEP S1 that engine torque has passed through the coast condition (a drive/non-drive judgment torque value J is reached at time t2 in FIG. 14), it is further judged whether a non-drive flag is raised (ON) (STEP S3). As a result, when the non-drive flag is made ON (that is, the duration between t2 and t5 in FIG. 14), it is determined that a non-drive state has been shifted to a drive state and the processing proceeds to STEP S5. In STEP S3, when it is determined that the non-drive flag is OFF (that is, in FIG. 14, it exceeds time t5), the processing is finished (END).

Figure 6:
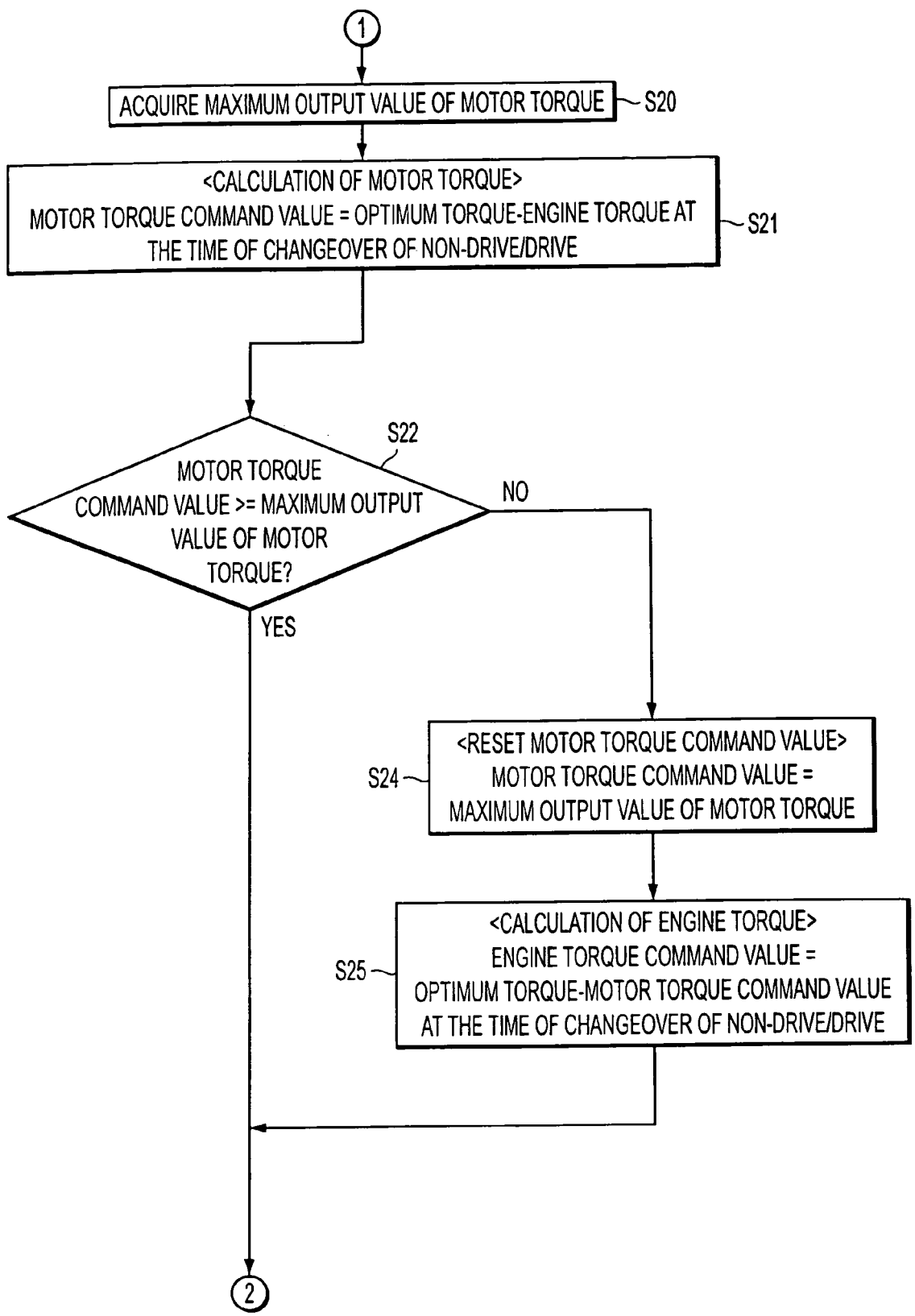
FIG. 6 is a flowchart illustrating control in the first embodiment.

In STEP S5, an output value of the motor 2 and/or the engine 1 at the time of non-drive/drive is calculated in a sub-routine in FIG. 6 described later, and thereafter the processing proceeds to STEP S6. Here, the sub-routine for calculation of a motor output value at the time of non-drive/drive in STEP S5 will be described. More specifically, a maximum output value of motor torque is acquired in STEP S20 as shown in FIG. 6. The maximum output value of motor torque indicates a negative torque value that can be output by the motor, and is varied depending upon the SOC (state of charge) of a battery (not shown). For example, when output is possible in terms of rotational speed but SOC is too high, 0 [nm] is adopted so as not to cause the motor 2 to generate electricity.

Then, after a necessary motor torque command value is calculated in STEP S21, the processing proceeds to STEP S22. More specifically, a motor torque command value is found in STEP S21 by subtracting an engine torque from an optimum torque at the time of changeover of non-drive/drive. Here, "optimum torque at the time of changeover of non-drive/drive" is a compatible value, which is varied depending upon the vehicle mounting thereon the control device according to the embodiment, and corresponds to a torque (for example, 30 Nm) for decreasing so-called crank noises when the non-drive condition shifts to a running condition with engine driving. The torque being varied depending upon a throttle opening degree so as to reflect a driver's intention. Also, "engine torque" referred to here is a negative torque when rotation is forcibly caused by torque, which acts from the side of drive wheels.

Consecutively, it is determined whether a motor torque command value calculated in STEP S21 is equal to or larger than a maximum torque output value (maximum motor torque output value) that can be output in a present state (STEP S22). As a result, when the motor torque command value is equal to or larger than the maximum motor torque output value, the processing proceeds to STEP S6 and when it is not, the processing proceeds to STEP S24.

Meanwhile, when it is determined in STEP S22 that the motor torque command value is less than the maximum motor torque output value, a maximum motor torque output value at present is reset as a motor torque command value in STEP S24, assuming that a demanded motor torque command value cannot be output from the motor 2 in a present state. And the motor torque command value reset in STEP S24 is used in STEP S25 to calculate a command value for engine torque used together with motor torque by means of the following formula: engine torque command value=optimum torque-motor torque command value at the time of changeover of non-drive/drive. Assuming that only motor torque is inadequate for the prevention of so-called crank noises, and thereafter the processing proceeds to STEP S6. In this case, engine torque is decreased by performing, for example, lag control, a demand for a smaller injection quantity than that at the time of fuel ON, or a demand for a reduction of an intake quantity to a predetermined cylinder among a plurality of cylinders in the engine 1.

Subsequently, it is determined in STEP S6 whether a demand for a reduction has been made from the automatic transmission mechanism 6. As a result, when the demand for a reduction has been made, the processing proceeds to STEP S11, and when it has not, the processing proceeds to STEP S9.

Figure 7:
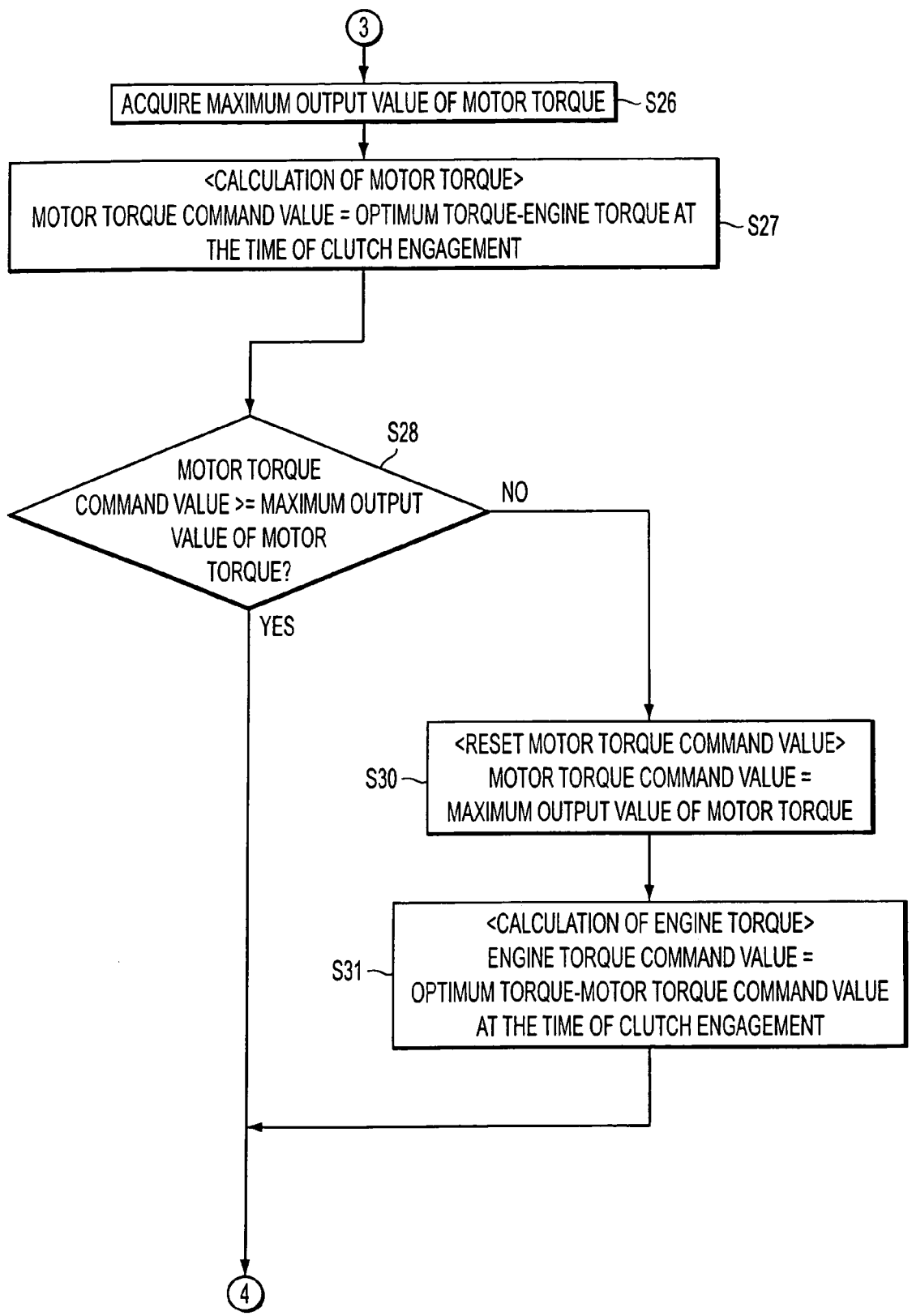
FIG. 7 is a flowchart illustrating control in the first embodiment.

Here, a sub-routine for the calculation of a motor/engine output value at the time of clutch engagement in STEP S11 will be described with reference to FIG. 7. First, a maximum output value of a motor torque is acquired in STEP S26. The maximum output value of a motor torque is the same as described in FIG. 6. Subsequently, after a necessary motor torque command value is calculated in STEP S27, the processing proceeds to STEP S28. More specifically, a motor torque command value is found in STEP S27 by subtracting an engine torque from an optimum torque at the time of clutch engagement. Here, "optimum torque at the time of clutch engagement" is a so-called compatible value similar to "optimum torque at the time of changeover of non-drive/drive" described above, and is one required for suppressing a shock due to torque fluctuation when clutches being frictional engagement elements make engagement in the automatic transmission mechanism 6. The torque being varied depending upon a throttle opening degree so as to reflect a driver's intention (for example, 30 Nm).

Consecutively, it is determined in STEP S28 whether a motor torque command value calculated in STEP S27 is equal to or larger than a maximum motor torque output value, and as a result, the processing proceeds to STEP S12 (FIG. 5) when the motor torque command value is smaller than the maximum motor torque output value.

Meanwhile, when it is determined in STEP S28 that the motor torque command value is below the maximum motor torque output value, a maximum motor torque output value at present is reset as a motor torque command value in STEP S30, assuming that a demanded motor torque command value cannot be output from the motor 2 in a present state. Consecutively, the motor torque command value reset in STEP S30 is used in STEP S31 to calculate a command value for engine torque used together with motor torque by means of the following formula: engine torque command value=an optimum torque-motor torque command value at the time of clutch engagement. Assuming that only a motor torque is inadequate to a torque for elimination of torque at the time of clutch engagement. In this case, engine torque is decreased by performing, for example, lag control, a demand for a smaller injection quantity than that at the time of fuel ON, or a demand for reduction of an intake quantity to a predetermined cylinder among a plurality of cylinders. Thereafter, the processing proceeds to STEP S12 shown in FIG. 5.

In STEP S9 it is determined whether a speed change is going on. As a result, when it is determined that speed change is going on, the processing proceeds to STEP S12, and when it is not, the processing proceeds to STEP S10.

Motor torque control is executed in STEP S12. In the motor torque control, the motor control means 53 timely controls a drive signal for the motor 2 through an ordinary proportional-plus-integral control (PI control) so that the calculated motor torque command value is reached, although contents of the sub-routine is not specifically shown. According to the execution of the motor torque control, a negative torque is output from the motor 2 as shown in B of FIG. 14 in a duration between t2 and t3 whereby a change in engine torque becomes linear in A of the figure and crank noises due to engine torque at the start of running is removed.

In STEP S10, it is determined whether a maximum output value of torque obtained by the addition of respective torques of the engine 1 and the motor 2 is smaller than a prescribed quantity C. When the maximum output value is smaller than the prescribed quantity C, the processing proceeds to STEP S13, and when it is not, a non-drive flag and the timer A are cleared in STEP S15 and the processing is terminated (END). The prescribed quantity C corresponds to an input torque for the termination of the control (that is, torque, which acts on the side of drive wheels from a side of the engine 1 and the motor 2), and assumes a value varied depending upon a throttle opening degree so as to reflect a driver's intention, the torque being set to, for example, 30 Nm.

In STEP S13, it is determined whether the timer A started in STEP S4 exceeds a prescribed time B. As a result, when the timer A is less than the prescribed time B, the processing proceeds to STEP S12 to continue the motor torque control. When the timer A exceeds the prescribed time B, a non-drive flag and the timer A are cleared in STEP S15 and the processing is terminated (END). Here, the prescribed time B is a timeout time, in which the control is terminated, and assumes a value varied depending upon a throttle opening degree so as to reflect a driver's intention, the time being set to, for example, 1 [sec].

Figure 15:
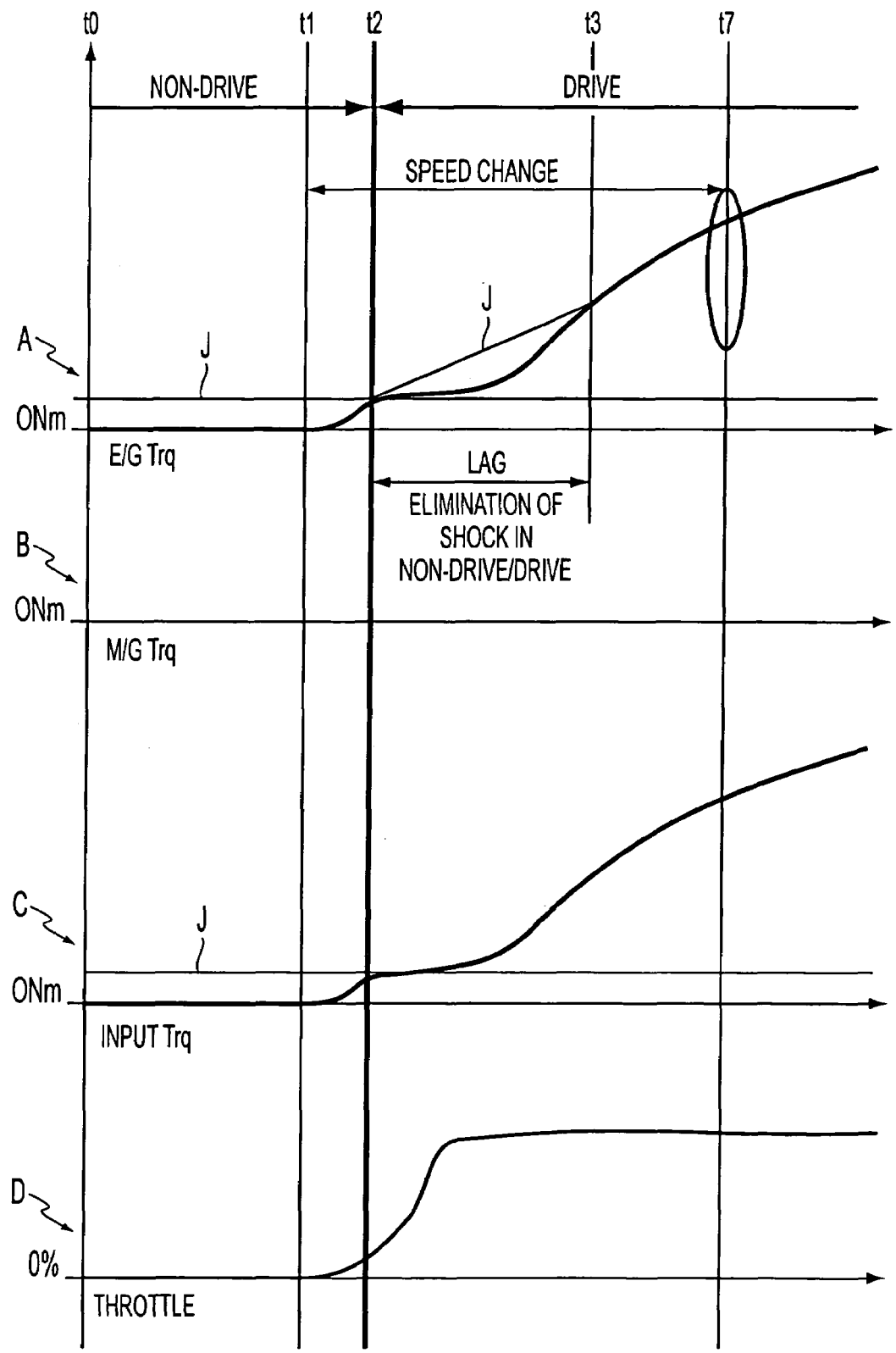
FIG. 15 is a timing chart illustrating comparative examples in control situations.

Here, a comparative example corresponding to the embodiment is shown in FIG. 15. In the figure, parts common to those in FIG. 14 are denoted by the same reference characters and an explanation therefor is omitted. In the comparative example, a lag control for delaying a timing at the time of engine ignition is carried out in order to eliminate a shock at the time of shift from a non-drive state to a drive state, so that an essential change in A engine torque appears as a decreased change in A of the figure, and torque shown in C is correspondingly decreased between t2 and t3. Also, since the lag control cannot be consecutively executed in terms of emission, a shock due to torque fluctuation at the time of clutch engagement is not eliminated at a time t7 in a change C in input torque (InputTrq) to the side of drive wheels, a depiction of which is omitted for the purpose of convenience.

Subsequently, a second embodiment of the invention will be described with reference to FIGS. 8 to 13. With the second embodiment, the situation of commands to the engine control means 52 and the motor control means 53 from the torque control means 54 in FIG. 1 is somewhat different as compared with the first embodiment. However, other parts in both embodiments are substantially the same, and so main parts are denoted by the same reference characters, an explanation therefor being omitted.

When control is started, a non-drive flag is raised (STEP S34) and the timer A is started to begin counting the non-drive→drive control time (STEP S35), when the coast judgment means 56 determines in STEP S33 that a rotational speed input from drive wheels is larger than an engine speed and engine torque is in a non-drive state (time t0 to t1 in FIG. 14), in which the judgment of the lock-up clutch being OFF is received from the lock-up clutch judgment means 58.

Meanwhile, when it is determined in STEP S33 that engine torque has passed through the coast condition (a drive/non-drive judgment torque value J is reached at time t2 in FIG. 14), it is further judged whether a non-drive flag is raised (ON) (STEP S36). As a result, when the non-drive flag is made ON (between t2 and t5 in FIG. 14), it is determined that the non-drive state has been shifted to a drive state and the processing proceeds to STEP S37. Meanwhile, when it is determined in STEP S36 that a non-drive flag is made OFF (time t5 in FIG. 14 has lapsed), the processing proceeds to STEP S65 shown in FIG. 9 to clear a non-drive flag and the timer A, and the processing is terminated (END).

Figure 8:
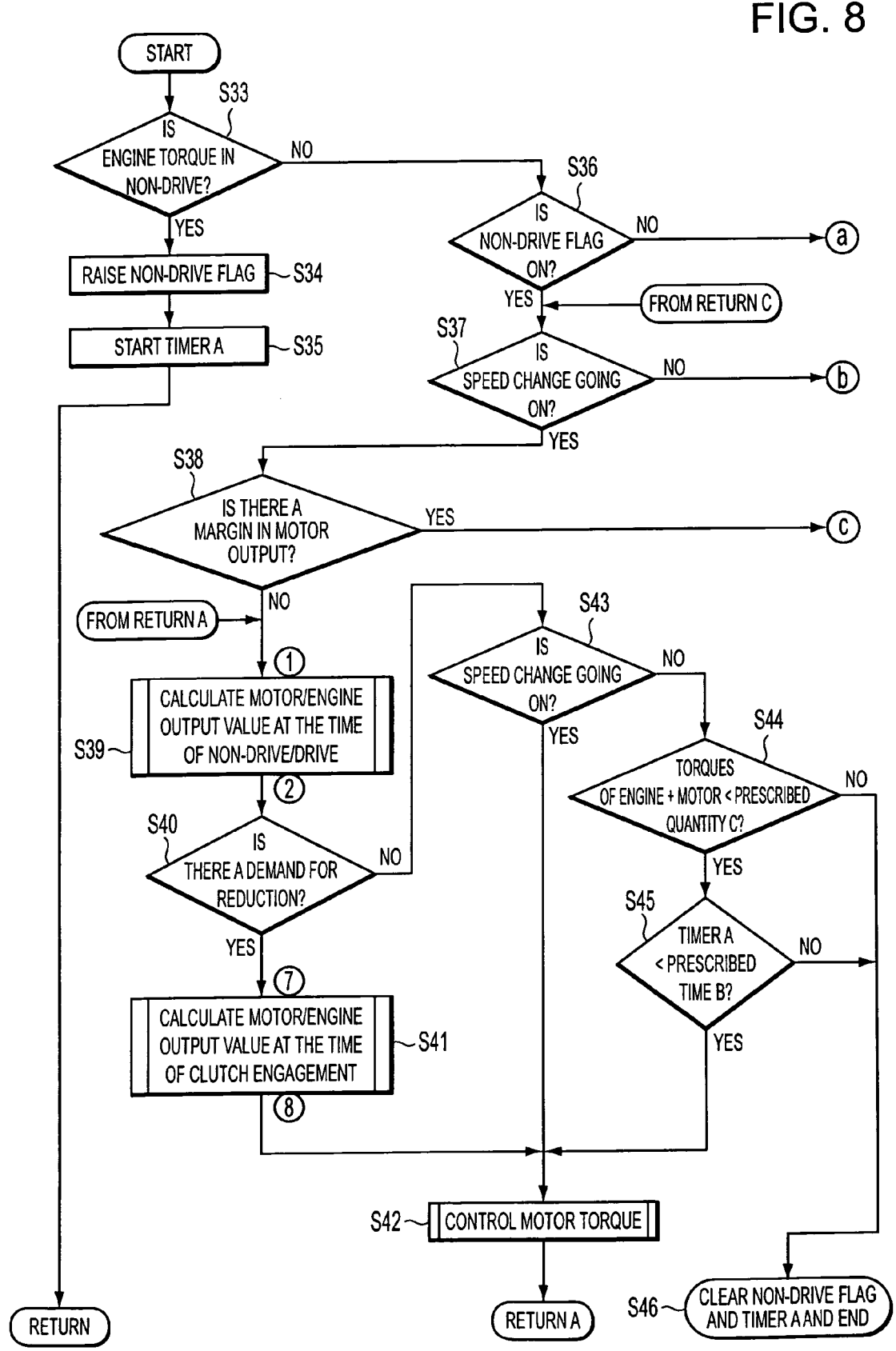
FIG. 8 is a flowchart illustrating control in a second embodiment.

Consecutively, the coast judgment means 56 determines in STEP S37 shown in FIG. 8 whether a speed change is going on. When it is determined that speed change is going on, the processing proceeds to STEP S38, and when it is not, the processing proceeds to STEP S61 shown in FIG. 9.

In STEP S38, the torque control means 13 determines a torque combination of the motor 2 and the engine 1. Here, when a throttle stepping acceleration and a throttle opening degree are large, it is estimated that a quantity of reduction at the time of non-drive→drive is large. As such comparative judgments of a maximum motor torque output quantity > a prescribed quantity D, a throttle opening degree < a prescribed quantity F, and a throttle stepping acceleration < a prescribed quantity G are made. All of the prescribed quantities D, F, G are comparative values, such that, for example, the prescribed quantity D can be set at 30 Nm, the prescribed quantity F can be set at 30%, and the prescribed quantity G can be set at 200%/sec.

Figure 9:
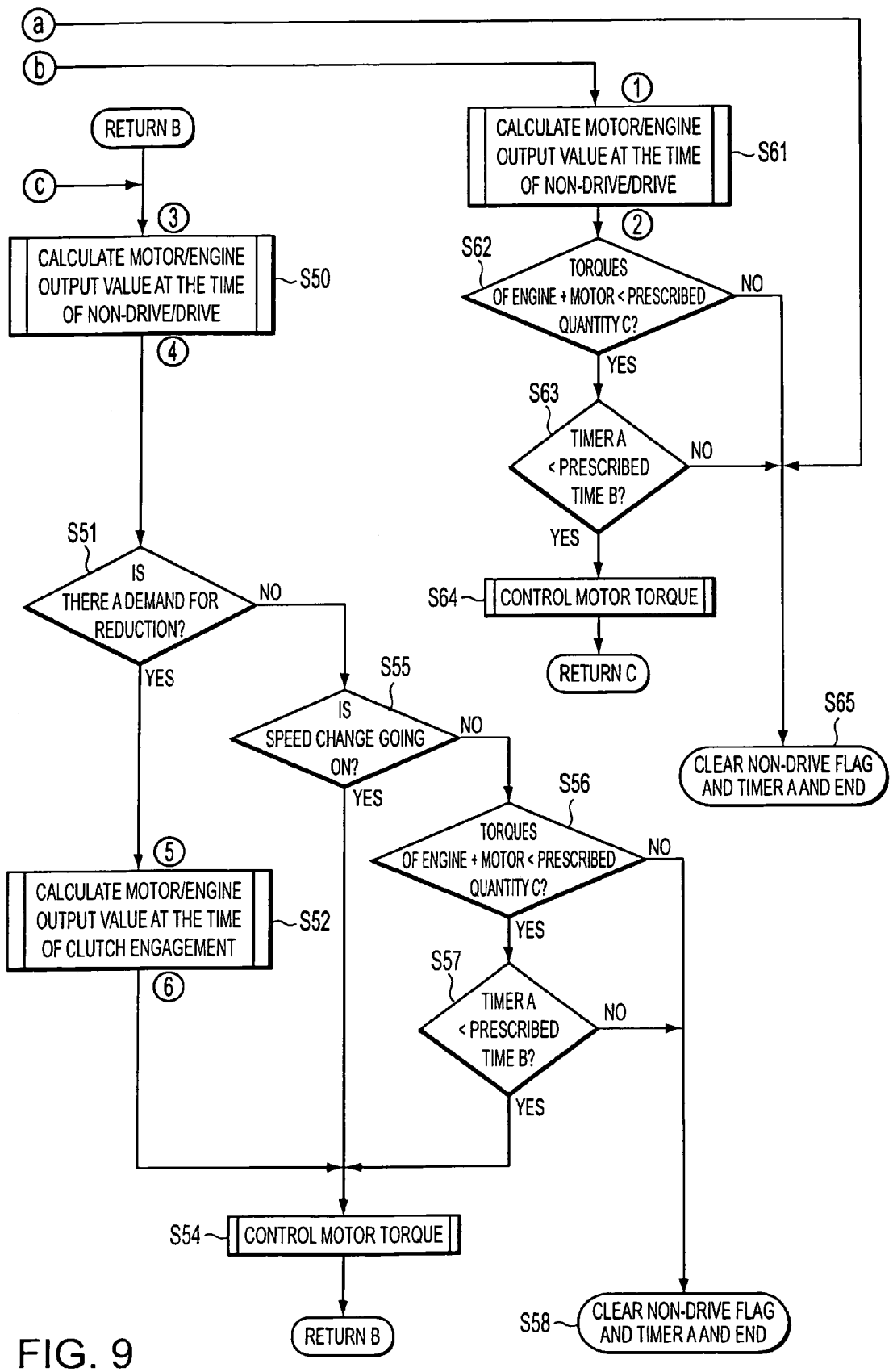
FIG. 9 is a flowchart illustrating control in the second embodiment.

In the case when it is determined, in STEP S38, that there is no margin in motor output (a combination of the motor and the engine is possible), the processing proceeds to STEP S39, and when it is determined that there is a relative margin in motor output (that is, the motor alone is possible), the processing proceeds to STEP S50 shown in FIG. 9.

Figure 10:
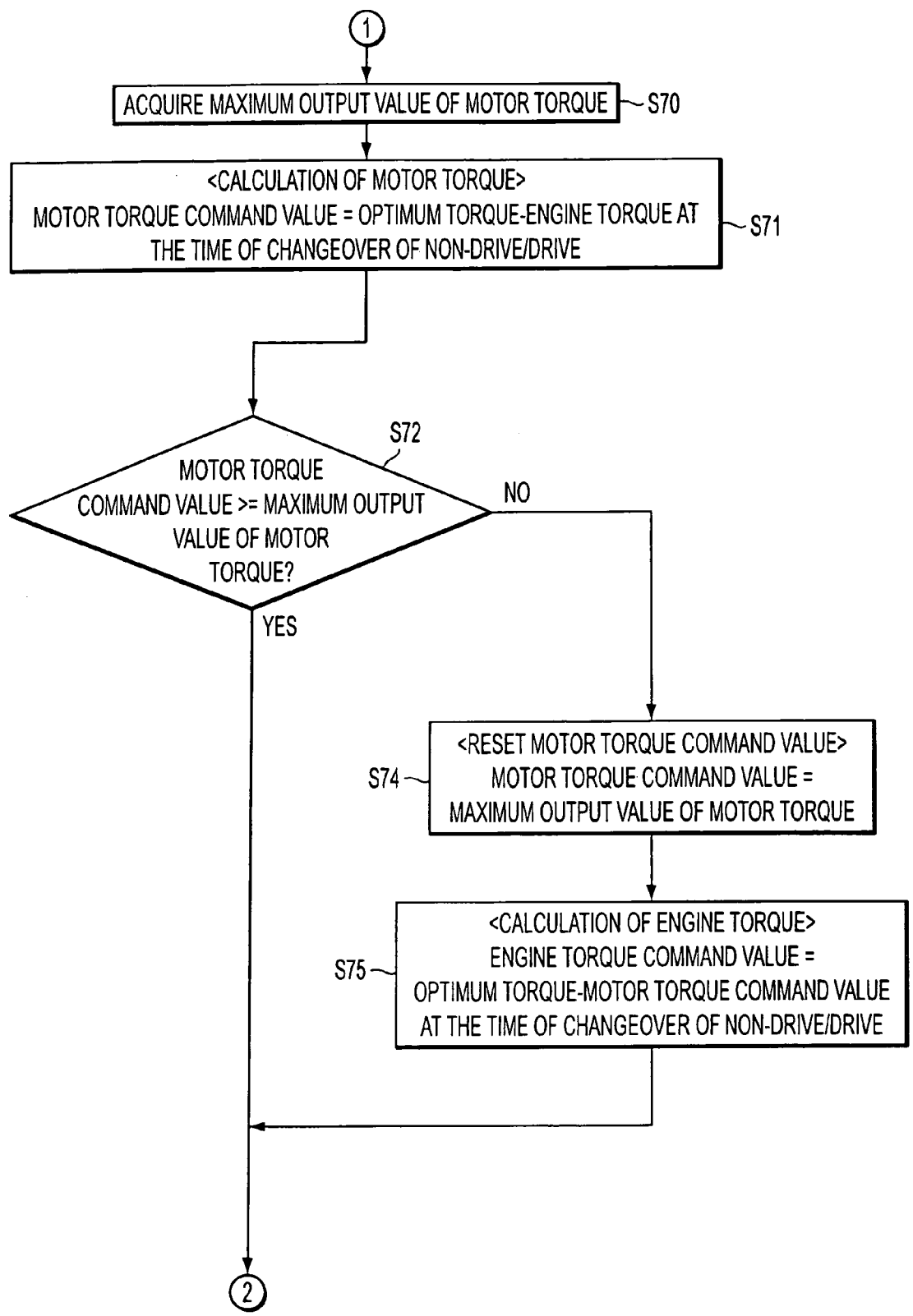
FIG. 10 is a flowchart illustrating control in the second embodiment.

Consecutively, a sub-routine of a processing "calculation of motor/engine output value at the time of non-drive/drive" shown in FIG. 10 is executed in STEP S39 to calculate output values of the motor 2 and the engine 1, and thereafter the processing proceeds to STEP S40.

Here, an explanation will be given to the processing "calculation of motor/engine output value at the time of non-drive/drive" executed in STEP S39. That is, as shown in FIG. 10, a maximum motor torque output value is first acquired in STEP S70. The maximum motor torque output value is the same as that in the first embodiment. Subsequently, a motor torque command value being required is calculated in STEP S71, and then the processing proceeds to STEP S72. More specifically, a motor torque command value is found in STEP S71 by subtracting an engine torque from an optimum torque at the time of changeover of non-drive/drive. At this time, "optimum torque at the time of changeover of non-drive/drive" is the same as that in the first embodiment.

Consecutively, it is determined in STEP S72 whether the motor torque command value calculated in STEP S71 is equal to or larger than a maximum motor torque output value, which is a maximum negative torque value that can be output at present. As a result, when a motor torque command value (for example, 80 Nm) is equal to or larger than a maximum motor torque output value (for example, −100 Nm), the processing proceeds to STEP S40 in FIG. 8.

Meanwhile, in the case where a motor torque command value (for example, −120 Nm) is smaller than a maximum motor torque output value (for example, −100 Nm), a maximum motor torque output value at present is reset as a motor torque command value in STEP S74, assuming that a motor torque command value cannot be output in a present situation. Consecutively, the motor torque command value reset in STEP S74 is used in STEP S75 to calculate a command value for engine torque used together with motor torque by means of the following formula: engine torque command value=an optimum torque−motor torque command value at the time of changeover of non-drive/drive. Assuming that only a motor torque is inadequate to a torque for elimination of crank noises. In this case, an engine torque is decreased by performing lag control, reduction in injection quantity, or reduction in intake quantity to a predetermined number of cylinders in the same manner as in the first embodiment. Thereafter, the processing proceeds to STEP S40 in FIG. 8.

Subsequently, it is determined in STEP S40 whether a demand for reduction has been made from the automatic transmission mechanism 6. As a result, when such a demand for reduction has been made, the processing proceeds to STEP S41 to execute a processing "calculation of motor/ engine output value at the time of clutch engagement", and when such a demand has not been made, the processing proceeds to STEP S43.

Figure 13:
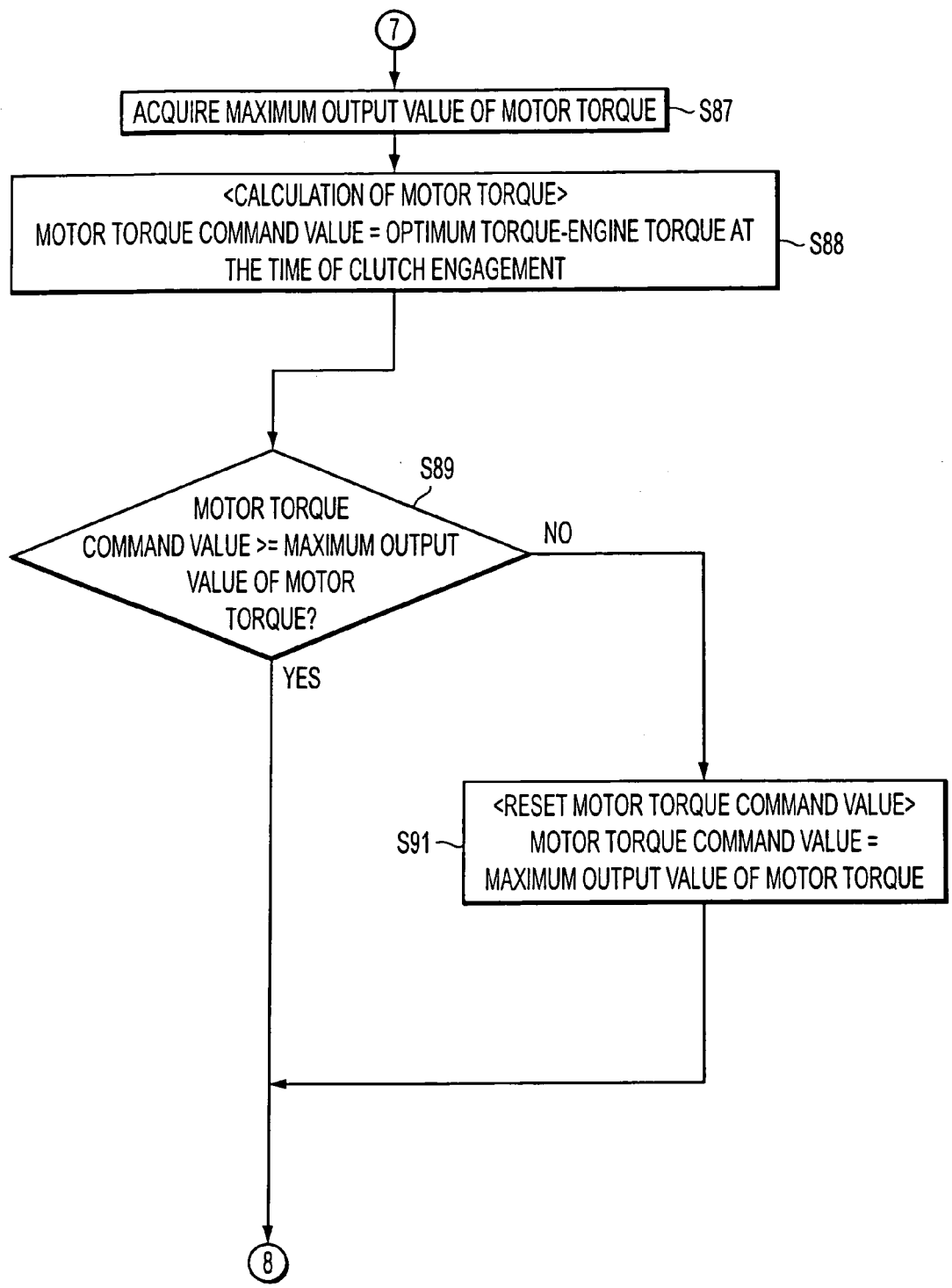
FIG. 13 is a flowchart illustrating control in the second embodiment.

Here, an explanation will be given to the processing "calculation of motor/engine output value at the time of clutch engagement" with reference to FIG. 13. First, a maximum motor torque output value is acquired in STEP S87. The maximum motor torque output value is the same as that illustrated in FIG. 10. Subsequently, a motor torque command value being required is calculated in STEP S88, and thereafter the processing proceeds to STEP S89. More specifically, a motor torque command value is found in STEP S88 by subtracting an engine torque from an optimum torque at the time of clutch engagement. These "optimum torque at the time of clutch engagement" and "engine torque" are the same as those in the first embodiment.

Consecutively, it is determined in STEP S89 whether the motor torque command value calculated in STEP S88 is equal to or larger than a maximum motor torque output value. As a result, when a motor torque command value is equal to or larger than a maximum motor torque output value, the processing proceeds to STEP S42 to perform motor torque control, and thereafter the processing returns to STEP S39 (Return A). Meanwhile, when it is determined in STEP S89 that a motor torque command value is smaller than a maximum motor torque output value, a maximum motor torque output value at present is reset as a motor torque command value in STEP S91, assuming that a motor torque command value being required cannot be output in a present situation. Thereafter the processing proceeds to STEP S42 in FIG. 8 to perform the motor torque control, and returns to STEP S39 (Return A). The motor torque control is the same as that illustrated in STEP S12 shown in FIG. 5 with respect to the first embodiment.

In STEP S43, it is determined whether a speed change is going on. As a result, when a speed change is going on, the processing proceeds to STEP S42 to perform the motor torque control, and returns to STEP S39 (Return A), and when it is not, the processing proceeds to STEP S44.

In STEP S44, it is determined whether a maximum output value of torque obtained by addition of respective torques of the engine 1 and the motor 2 is smaller than a prescribed quantity C. When the maximum output value is smaller than the prescribed quantity C, the processing proceeds to STEP S45, and when it is not, a non-drive flag and the timer A are cleared in STEP S46 and the processing is terminated (END). The prescribed quantity C is the same as that illustrated in STEP S10 shown in FIG. 5 with respect to the first embodiment.

In STEP S45, it is determined whether the timer A started in STEP S35 exceeds a prescribed time B. As a result, when the timer A is less than the prescribed time B, the processing proceeds to STEP S42 to continue the motor torque control, and when the timer A exceeds the prescribed time B, a non-drive flag and the timer A are cleared in STEP S46 and the processing is terminated (END). The prescribed time B is the same as that illustrated in STEP S13 shown in FIG. 5 with respect to the first embodiment.

When it is determined in STEP S37 that speed change is not going on, the processing proceeds to STEP S61 to execute the processing "calculation of motor/engine output value at the time of non-drive/drive" described with respect to STEP S39, and thereafter proceeds to STEP S62. After it is determined in STEP S62 whether a maximum output value of torque obtained by addition of respective torques of the engine 1 and the motor 2 is smaller than a prescribed quantity C, it is determined in STEP S63 whether the timer A exceeds the prescribed time B. When the timer is smaller than the prescribed time B, the motor torque control is executed in STEP S64, and thereafter the processing returns to STEP S37 (Return C) shown in FIG. 8. Also, when a maximum output value of torque obtained by the addition of respective torques of the engine 1 and the motor 2 is equal to or larger than the prescribed quantity C in STEP S62, and in the case where the timer A exceeds the prescribed time B in STEP S63, the processing proceeds to STEP S65 to clear a non-drive flag and the timer A, and is terminated (END).

Figure 11:
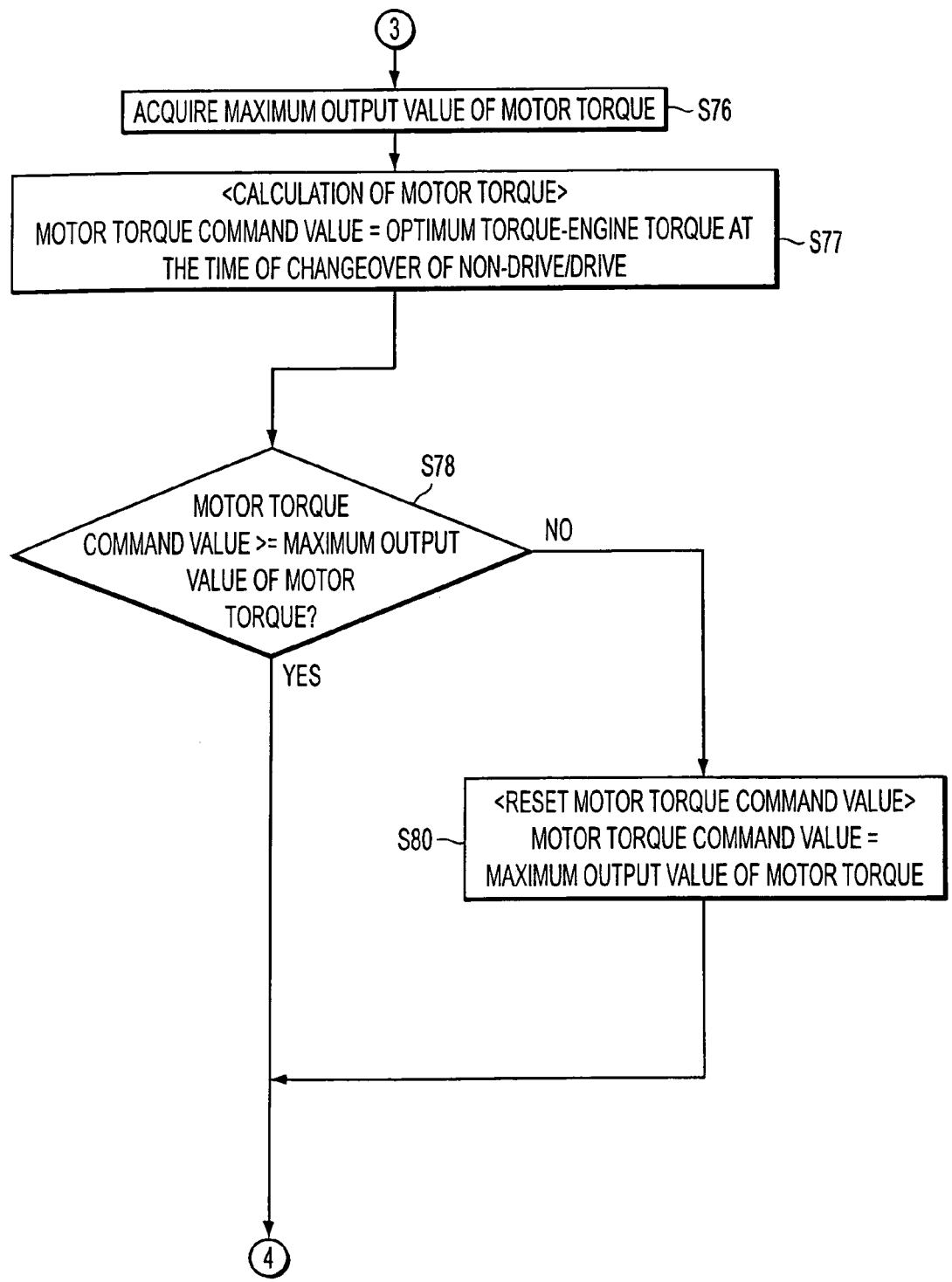
FIG. 11 is a flowchart illustrating control in the second embodiment.

When it is determined in STEP S38 that there is a relative margin in motor output, the processing proceeds to STEP S50 to execute a sub-routine of the processing "calculation of motor/engine output value at the time of non-drive/drive" shown in FIG. 11 to calculate an output value of the motor 2, and thereafter the processing proceeds to STEP S51.

Here, an explanation will be given to the processing "calculation of motor output value at the time of drive/non-drive" executed in STEP S50. That is, a maximum motor torque output value is first acquired in STEP S76, as shown in FIG. 11. The maximum motor torque output value is the same as that described in the first embodiment. Subsequently, a motor torque command value being required is calculated in STEP S77, and thereafter the processing proceeds to STEP S78. More specifically, a motor torque command value is found in STEP S77 by subtracting an engine torque from an optimum torque at the time of non-drive/drive. At this time, "optimum torque at the time of non-drive/drive" is the same as that in the first embodiment.

In STEP S78, a determination is made as to whether the motor torque command value calculated in STEP S77 is equal to or larger than a maximum motor torque output value, which is a maximum negative torque value that can be output in a present situation. As a result, when the motor torque command value is equal to or larger than the maximum motor torque output value, the processing proceeds to STEP S51 shown in FIG. 9. Meanwhile, when it is determined in STEP S78 that the motor torque command value is smaller than the maximum motor torque output value, a maximum motor torque output value at present is reset as a motor torque command value in STEP S80, assuming that a motor torque command value cannot be output in a present situation, and the processing proceeds to STEP S51.

Subsequently, it is determined in STEP S51 whether a demand for reduction has been made from the automatic transmission mechanism 6. As a result, when such a demand for reduction has been made, the processing proceeds to STEP S52 to execute a processing "calculation of motor/engine output value at the time of clutch engagement", and when such demand has not been made, the processing proceeds to STEP S55.

Figure 12:
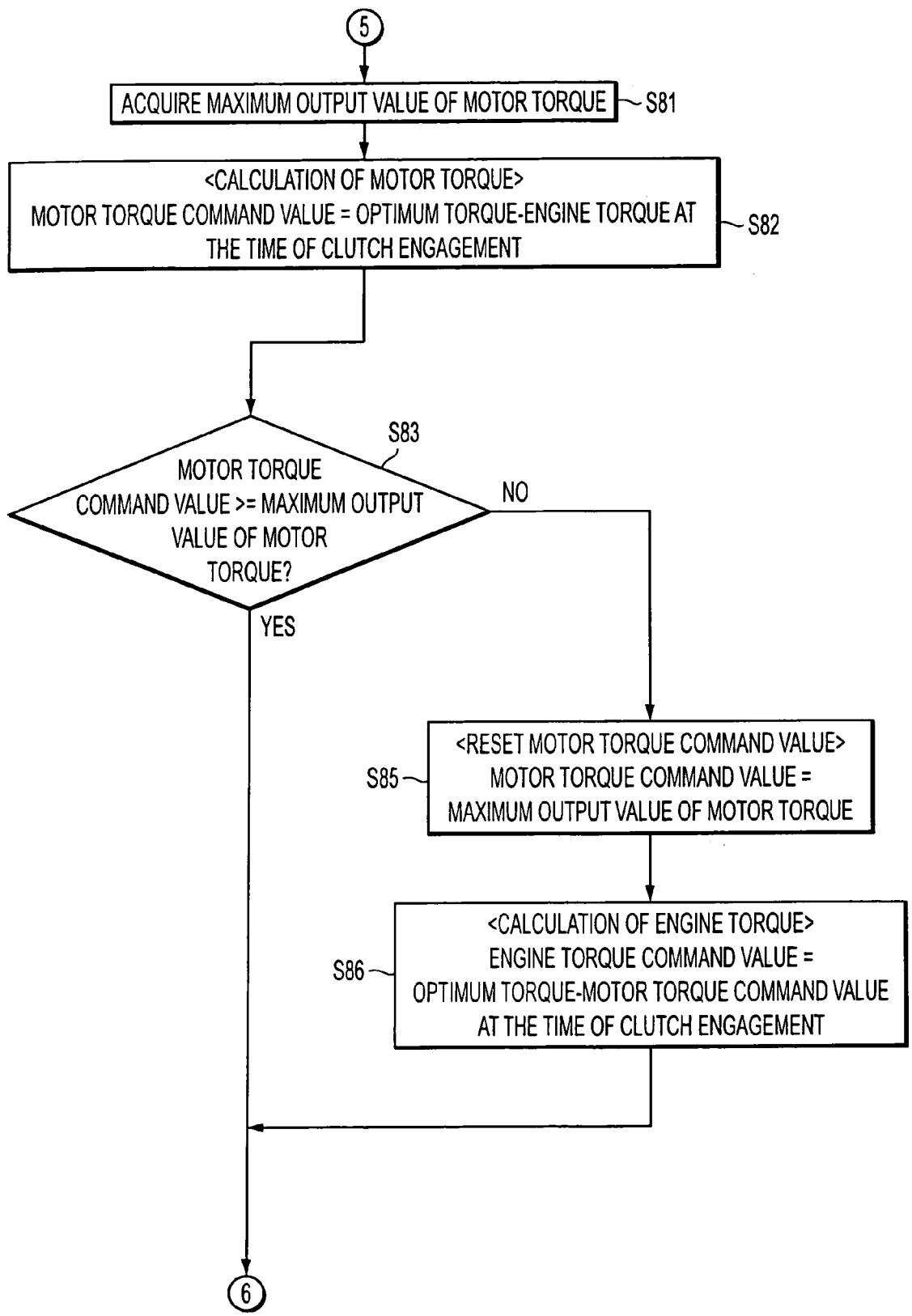
FIG. 12 is a flowchart illustrating control in the second embodiment.

Here, an explanation will be given to the processing "calculation of motor/engine output value at the time of clutch engagement" with reference to FIG. 12. That is, a maximum motor torque output value is first acquired in STEP S81. The maximum motor torque output value is the same as that illustrated in FIG. 11. Subsequently, a motor torque command value being required is calculated in STEP S82, and thereafter the processing proceeds to STEP S83. More specifically, a motor torque command value is found in STEP S82 by subtracting an engine torque from an optimum torque at the time of clutch engagement. These "optimum torque at the time of clutch engagement" and "engine torque" are the same as those in the first embodiment.

Consecutively, it is determined in STEP S83 whether the motor torque command value calculated in STEP S82 is equal to or larger than a maximum motor torque output value. As a result, when a motor torque command value is equal to or larger than a maximum motor torque output value, the processing proceeds to STEP S54 in FIG. 9 to perform the same motor torque control as in STEP S42, and thereafter the processing returns to STEP S50 (Return B). Meanwhile, when it is determined in STEP S83 that a motor torque command value is smaller than a maximum motor torque output value, a maximum motor torque output value at present is reset as a motor torque command value in STEP S85 assuming that a motor torque command value being required cannot be output from the motor 2 in a present situation.

Consecutively, the motor torque command value reset in STEP S85 is used in STEP S86 to calculate a command value for engine torque used together with motor torque by means of the following formula: engine torque command value=an optimum torque−motor torque command value at the time of clutch engagement. Assuming that only a motor torque is inadequate to a torque for elimination of a shock at the time of clutch engagement. In this case, an engine torque is decreased by performing, for example, lag control, a demand for a smaller injection quantity than that at the time of fuel ON, or a demand for reduction of an intake quantity to a predetermined number of cylinders among a plurality of cylinders. Thereafter, the processing proceeds to STEP S54 shown in FIG. 9.

Also, in STEP S55, to which the processing proceeds assuming that no demand for reduction has been made, it is determined whether a speed change is going on. As a result, when a speed change is going on, the processing proceeds to STEP S54 to perform the motor torque control, and returns to STEP S50 (Return B), and when it is not, the processing proceeds to STEP S56.

In STEP S56, it is determined whether a maximum output value of torque obtained by the addition of respective torques of the engine 1 and the motor 2 is smaller than a prescribed quantity C. When the maximum output value is smaller than the prescribed quantity C, the processing proceeds to STEP S57, and when not so, proceeds to STEP S58 to clear a non-drive flag and the timer A, and is terminated (END). The prescribed quantity C is the same as that described above.

In STEP S57, it is determined whether the timer A started in STEP S35 exceeds a prescribed time B. As a result, when the timer A is less than the prescribed time B, the processing proceeds to STEP S54 to continue the motor torque control, and when the timer A exceeds the prescribed time B, a non-drive flag and the timer A are cleared in STEP S58 and the processing is terminated (END). The prescribed time B is the same as that described above.

As described above, according to the first and second embodiments, when torque-down control, in which the torque-down control means (54, 56) reduces an input torque to the automatic transmission 3, is consecutively carried out, a negative torque output from the motor 2 is used to perform the torque-down control at least once. As such, even when a demand for a reduction of an input torque to a transmission is consecutively made, the demand can be met with no problem by making effective use of the motor 2 peculiar to a hybrid vehicle. Specifically, motor driving based on a control with the torque control means 54 makes it possible to carry out at least one of an engine-torque inhibitory control when engine driving is started from the coast condition, and an engine-torque inhibitory control at the time of speed change after the start of engine driving. As such, the one engine-torque inhibitory control is carried out with a negative torque of the motor 2 whereby the other engine-torque inhibitory control can be carried out by either a motor torque control or an engine lag control. Accordingly, a demand for reduction of an input torque to the automatic transmission 3 that is consecutively made can be smoothly met without causing deterioration in emission, delay in response of output torque, or the like. Therefore, it is possible to remove the crank noises caused when coast running shifts to engine-driving running and a succeeding shock at the time of clutch engagement in the automatic transmission 3, thus sharply improving a feeling in running.

Also, when the coast judgment means 56 determines that the coast condition has been passed through, the torque control means 54 acquires a maximum torque output value that can be output from the motor 2, calculates a necessary motor torque command value, and carries out the engine-torque inhibitory control for reduction of so-called crank noises, on the basis of a comparison between the both values by means of only a negative torque output of the motor 2, or addition of reduction of output of the engine 1 to the negative torque output. As such, it is possible to realize an accurate control, such as SOC or the like, conformed to differences among various conditions on each occasion.

Further, when functioning as a speed-change detection means to determine the start of a speed change after the engine-torque inhibitory control for reduction of crank noises is carried out, the torque control means 54 acquires a maximum torque output value that can be output from the motor 2, calculates a necessary motor torque command value, and carries out the engine-torque inhibitory control for reduction of a shock in engagement of clutches at the time of speed-change. This is based on a comparison between both values by means of only a negative torque output of the motor 2, or addition of reduction of output of the engine 1 to the negative torque output. As such, it is possible to realize an accurate control, such as SOC or the like, conformed to differences among various conditions on each occasion.

Also, when the coast judgment means 56 determines the presence and absence of a coast condition on the basis of changes in rotational speed or changes in torque for input and output sides of the automatic transmission 3, a simple constitution without the provision of separate and special sensors makes it possible to readily and surely make a judgment on the presence and absence of a coast condition. Also, when the motor 2 generates a negative torque, the torque control means 54 executes a predetermined processing such as lag control on the engine 1 or the like to assist a torque control due to the generation of a negative torque from the motor 2, an adequate torque control can be carried out even in the case where SOC of a battery for supplying electricity to the motor 2 is full and no adequate negative torque can be drawn from the motor 2.

Further, the coast judgment means 56 determines a coast condition in the case where a rotational speed on an output side is larger than an engine speed on an input side, when the lock-up clutch 27 is OFF, and determines a coast condition in the case where an engine torque on the input side is below a predetermined value, when the lock-up clutch 27 is ON. It is thus possible to obtain appropriate results of judgment according to a difference depending upon ON and OFF of the lock-up clutch 27.

According to an exemplary aspect of the invention, since the controller performs torque reduction control, by which an input torque to the transmission is reduced at least once by a negative torque output from the motor when the torque reduction control is consecutively performed, a peculiar motor is made use of in order to meet a demand for a reduction of an input torque to a transmission that is consecutively made.

According to another exemplary aspect of the invention, since motor driving carries out at least one of an engine-torque inhibitory control when engine driving is started from the coast condition and an engine-torque inhibitory control at the time of speed change after the start of engine driving, one engine-torque inhibitory control is carried out with a negative torque of the motor whereby another engine-torque inhibitory control can be carried out by either a motor torque control or an engine lag control. Accordingly, even a demand for a reduction of an input torque to the transmission that is consecutively made can be smoothly met without causing deterioration in emission, delay in response of output torque, or the like.

According to another exemplary aspect of the invention, when it comes to an out-of-the coast condition, the controller makes a comparison between a maximum torque output value and a necessary motor torque command value to carry out the first engine-torque inhibitory control by only the negative torque output of the motor, or an addition of a reduction of output of the engine and the negative torque output from the motor. It is thus possible to realize an accurate control that is conformed to differences among various conditions, such as SOC or the like, on each occasion.

According to another exemplary aspect of the invention, since a beginning of a speed-change is judged after the first engine-torque inhibitory control is carried out, the torque controller makes a comparison between a maximum torque output value and a necessary motor torque command value to carry out the second engine-torque inhibitory control by only the negative torque output of the motor, or the addition of the reduction of output of the engine and the negative torque output from the motor. It is thus possible to realize an accurate control conformed to differences among various conditions, such as SOC or the like, on each occasion.

According to another exemplary aspect of the invention, since the controller judges a presence and absence of the coast condition on the basis of changes in rotational speed, or changes in torque on an input side and an output side of the hydraulic transmission, a simple constitution without the provision of separate and special sensors makes it possible to readily and surely make a judgment on the presence and absence of a coast condition.

According to another exemplary aspect of the invention, when a negative torque is generated by the motor, the controller executes a processing for a reduction of torque to the engine to assist a torque control due to the negative torque from the motor. An adequate torque control can thus be carried out even when a SOC of a battery for supplying electricity to the motor is full and no adequate negative torque can be drawn from the motor.

According to another exemplary aspect of the invention, since the controller judges a presence of the coast condition when a rotational speed on the output side is larger than an engine speed on the input side, when the lock-up clutch is OFF, and a presence of the coast condition in the case where an engine torque on the input side is below a predetermined value, when the lock-up clutch is ON, it is possible to obtain appropriate results of judgment according to a difference depending upon ON and OFF of the lock-up clutch.

It is to be understood that the invention is not limited to the foregoing embodiments or constructions, but may also be carried out with various other modifications based on the sprit of the invention. That is, the invention is intended to cover such various modifications and equivalent arrangements.

What is claimed is:

1. A control device for hybrid vehicles, comprising:
   a motor drivingly connected to an engine,
   a transmission that transmits output torques of the engine and the motor to drive wheels; and
   a controller that performs torque reduction control by which an input torque to the transmission is reduced, wherein when torque reduction control is consecutively performed, the input torque is reduced at least once by a negative torque output from the motor, wherein the controller:
   judges a presence and an absence of a coast condition, in which the vehicle is caused to perform an inertial running, when the vehicle is running;
   judges whether there is a speed-change with the transmission; and
   performs, by the negative torque output from the motor, at least one of a first engine-torque inhibitory control at a start of driving of the engine to respond to a judgment of a coast condition and a second engine-torque inhibitory control at a time of the speed-change after the start of driving of the engine to respond to a detection of a beginning of the speed-change performed.

2. The control device for hybrid vehicles according to claim 1, wherein when the controller judges an out of coast condition, the controller:
   acquires a maximum torque output value that can be output from the motor;
   calculates a necessary motor torque command value; and
   carries out the first engine-torque inhibitory control on the basis of a comparison between the maximum torque output value and the necessary motor torque command value with only the negative torque output from the motor, or an addition of a reduction of output of the engine and the negative torque output from the motor.

3. The control device for hybrid vehicles according to claim 2, wherein when the controller judges the beginning of the speed-change after the first engine-torque inhibitory control is carried out, the controller:
   acquires the maximum torque output value that can be output from the motor;
   calculates the necessary motor torque command value; and
   carries out the second engine-torque inhibitory control on the basis of the comparison between the maximum torque output value and the necessary motor torque command value with only the negative torque output from the motor, or the addition of the reduction of output of the engine and the negative torque output from the motor.

4. The control device for hybrid vehicles according to claim 1, wherein the transmission comprises:
   a hydraulic transmission that receives the output torques of the engine and the motor; and
   an automatic transmission mechanism that receives the output torques through the hydraulic transmission, wherein the controller judges the presence and absence of the coast condition based on changes in rotational speed or changes in torque on an input side and an output side of the hydraulic transmission.

5. The control device for hybrid vehicles according to claim 4, wherein, when the negative torque is generated by the motor, the controller executes a processing for reducing torque to the engine to assist a torque control due to the negative torque from the motor.

6. The control device for hybrid vehicles according to claim 5, wherein the transmission comprises:
   the hydraulic transmission having a lock-up clutch capable of providing a direct connection between the input side to receive output torques of the engine and the motor, and the output side to transmit the output torques to a downstream side of power transmission; and
   the automatic transmission mechanism to receive the output torques through the hydraulic transmission, wherein the controller judges a presence of the coast condition when a rotational speed on the output side is larger than an engine speed on the input side, when the lock-up clutch is OFF, or presence of the coast condition when an engine torque on the input side is below a predetermined value when the lock-up clutch is ON.

7. A method of controlling a motor drivingly connected to an engine and a transmission that transmits output torques of the engine and the motor to drive wheels, comprising:
   performing torque reduction control by which an input torque to the transmission is reduced, wherein when torque reduction control is consecutively performed, the input torque is reduced at least once by a negative torque output from the motor;

judging a presence and an absence of a coast condition, in which the vehicle is caused to perform an inertial running, when the vehicle is running;

judging whether there is a speed-change with the transmission; and performing, by the negative torque output from the motor, at least one of a first engine-torque inhibitory control at a start of driving of the engine to respond to a judgment of a coast condition and a second engine-torque inhibitory control at a time of the speed-change after the start of driving of the engine to respond to a detection of a beginning of the speed-change performed.

8. The method of claim 7, wherein when an out of coast condition is judged, comprising:

acquiring a maximum torque output value that can be output from the motor;

calculating a necessary motor torque command value; and carrying out the first engine-torque inhibitory control on the basis of a comparison between the maximum torque output value and the necessary motor torque command value with only the negative torque output from the motor, or an addition of a reduction of output of the engine and the negative torque output from the motor.

9. The method of claim 8, wherein when the beginning of the speed-change after the first engine-torque inhibitory control is carried out is judged, comprising:

acquiring the maximum torque output value that can be output from the motor;

calculating the necessary motor torque command value; and carrying out the second engine-torque inhibitory control on the basis of the comparison between the maximum torque output value and the necessary motor torque command value with only the negative torque output from the motor, or the addition of the reduction of output of the engine and the negative torque output from the motor.

10. The method of claim 7, wherein the transmission comprises a hydraulic transmission that receives the output torques of the engine and the motor and an automatic transmission mechanism that receives the output torques through the hydraulic transmission, comprising:

judging the presence and absence of the coast condition based on changes in rotational speed or changes in torque on an input side and an output side of the hydraulic transmission.

11. The method of claim 10, wherein when the negative torque is generated by the motor, comprising:

executing a processing for reducing torque to the engine to assist a torque control due to the negative torque from the motor.

12. The method of claim 11, wherein the transmission comprises the hydraulic transmission having a lock-up clutch capable of providing a direct connection between the input side to receive output torques of the engine and the motor, and the output side to transmit the output torques to a downstream side of power transmission and the automatic transmission mechanism to receive the output torques through the hydraulic transmission, comprising:

judging a presence of the coast condition when a rotational speed on the output side is larger than an engine speed on the input side, when the lock-up clutch is OFF, or presence of the coast condition when an engine torque on the input side is below a predetermined value when the lock-up clutch is ON.

13. A control device for hybrid vehicles, comprising:

means for transmitting output torques of an engine and a motor to drive wheels; and means for performing torque reduction control, the means for performing torque reduction control:

reducing input torque to the means for transmitting, wherein when torque reduction control is consecutively performed, the input torque is reduced at least once by a negative torque output from the motor;

judges a presence and an absence of a coast condition, in which the vehicle is caused to perform an inertial running, when the vehicle is running;

judges whether there is a speed-change with the means for transmitting; and performs, by the negative torque output from the motor, at least one of a first engine-torque inhibitory control at a start of driving of the engine to respond to a judgment of a coast condition and a second engine-torque inhibitory control at a time of the speed-change after the start of driving of the engine to respond to a detection of a beginning of the speed-change performed.

14. The control device for hybrid vehicles according to claim 13, wherein when the means for performing torque reduction control judges an out of coast condition, the means for performing torque reduction control:

acquires a maximum torque output value that can be output from the motor;

calculates a necessary motor torque command value; and carries out the first engine-torque inhibitory control on the basis of a comparison between the maximum torque output value and the necessary motor torque command value with only the negative torque output from the motor, or an addition of a reduction of output of the engine and the negative torque output from the motor.

15. The control device for hybrid vehicles according to claim 14, wherein when the means for performing torque reduction control judges the beginning of the speed-change after the first engine-torque inhibitory control is carried out, the means for performing torque reduction control;

acquires the maximum torque output value that can be output from the motor;

calculates the necessary motor torque command value; and carries out the second engine-torque inhibitory control on the basis of the comparison between the maximum torque output value and the necessary motor torque command value with only the negative torque output from the motor, or the addition of the reduction of output of the engine and the negative torque output from the motor.

16. The control device for hybrid vehicles according to claim 13, wherein the means for transmitting comprises:

a first means of receiving the output torques of the engine and the motor; and a second means of receiving the output torques through the first means of receiving, wherein the means for performing torque reduction control judges the presence and absence of the coast condition based on changes in rotational speed or changes in torque on an input side and an output side of the first means of receiving.

17. The control device for hybrid vehicles according to claim 16, wherein, when the negative torque is generated by the motor, the means for performing torque reduction control executes a processing for reducing torque to the engine to assist a torque control due to the negative torque from the motor.

18. The control device for hybrid vehicles according to claim 17, wherein the means for transmitting comprises:
- the first means of receiving having a lock-up clutch capable of providing a direct connection between the input side to receive output torques of the engine and the motor, and the output side to transmit the output torques to a downstream side of power transmission; and
- the second means of receiving to receive the output torques through the hydraulic transmission, wherein the means for performing torque reduction control judges a presence of the coast condition when a rotational speed on the output side is larger than an engine speed on the input side, when the lock-up clutch is OFF, or presence of the coast condition when an engine torque on the input Lside is below a predetermined value when the lock-up clutch is ON.

* * * * *